(12) United States Patent
Kamijo

(10) Patent No.: US 8,001,370 B2
(45) Date of Patent: Aug. 16, 2011

(54) ENCRYPTED COMMUNICATION FOR SELECTIVELY DELIVERING A MESSAGE TO MULTIPLE DECRYPTING DEVICES

(75) Inventor: Koichi Kamijo, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/570,173

(22) Filed: Sep. 30, 2009

(65) Prior Publication Data

US 2010/0080385 A1 Apr. 1, 2010

Related U.S. Application Data

(63) Continuation of application No. 12/193,569, filed on Aug. 18, 2008, now Pat. No. 7,739,492, which is a continuation of application No. 11/167,018, filed on Jun. 24, 2005, now Pat. No. 7,620,806.

(30) Foreign Application Priority Data

Jun. 24, 2004 (JP) ................................. 2004-186640

(51) Int. Cl.
*H04L 9/00* (2006.01)
(52) U.S. Cl. ............................ 713/150; 380/255; 380/44
(58) Field of Classification Search ............... 380/44, 380/255, 259, 264, 269, 277–279, 286, 45, 380/47; 713/150, 156–157, 168, 171, 189, 713/193; 726/26–27; 705/50–51, 64, 71; 707/100–102
See application file for complete search history.

(56) References Cited

U.S. PATENT DOCUMENTS

| | | | |
|---|---|---|---|
| 5,592,552 | A | 1/1997 | Fiat |
| 5,825,880 | A | 10/1998 | Sudia et al. |
| 5,901,227 | A | 5/1999 | Perlman |
| 6,041,408 | A | 3/2000 | Nishioka et al. |
| 6,222,923 | B1 | 4/2001 | Schwenk |
| 7,158,639 | B2 | 1/2007 | Benaloh |
| 7,184,551 | B2 | 2/2007 | Slavin |

(Continued)

FOREIGN PATENT DOCUMENTS

JP 11187013 7/1999

(Continued)

OTHER PUBLICATIONS

Fiat and M. Naor, "Broadcast Encryption," Crypto '93, Lecture Notes in Computer Science (LNCS) 773, pp. 480-491, 1994.

(Continued)

*Primary Examiner* — Ponnoreay Pich
*Assistant Examiner* — John B King
(74) *Attorney, Agent, or Firm* — Shimokaji & Associates, PC

(57) ABSTRACT

Reduces message length of encrypted message to be transmitted selectively to plurality of decrypting devices. An encrypting device includes a generating unit for generating node associating information configured to associate respective terminal nodes in a tree structure with each decrypting device in relation to a group of decrypting devices enabled for decryption, an extracting unit for extracting a decryption enabled node containing decrypting devices in descendant terminal nodes and not containing a decrypting device with decryption disabled in any of the descendant terminal nodes, and a unit for encrypting the message by use of a node encryption key for the decryption enabled node. Decrypting devices include specifying unit for specifying terminal node associated with decrypting device based on node associating information, and a decrypting unit for decrypting encrypted message using a node decryption key for any decryption enabled nodes ranging from terminal node to root node thereof.

24 Claims, 14 Drawing Sheets

U.S. PATENT DOCUMENTS

| | | |
|---|---|---|
| 2002/0039420 A1 | 4/2002 | Shacham et al. |
| 2002/0136411 A1 | 9/2002 | Ishiguro et al. |
| 2002/0147906 A1 | 10/2002 | Lotspiech et al. |
| 2003/0061481 A1 | 3/2003 | Levine et al. |
| 2004/0210762 A1 | 10/2004 | Kawamoto et al. |
| 2005/0036615 A1 | 2/2005 | Jakobsson et al. |

FOREIGN PATENT DOCUMENTS

| | | |
|---|---|---|
| JP | 2002123429 | 4/2002 |
| JP | 2003273858 | 9/2003 |
| JP | 2003289297 | 10/2003 |

OTHER PUBLICATIONS

D. Naor, M. Naor, and J. Lotspiech, "Revocation and Tracing Scheme for Stateless Receivers," Advances in Cryptology—Crypto 200 I, Lecture Notes in Computer Science (LNCS) 2139, Springer, pp. 41-62, 200 I.

Matsuzaki et ai, "Tree Structure Key Management Method Supporting Multiple Systems," SCIS '02, pp. 721-726, 2002.

Okuaki et al, "Proposal ofa Hybrid System Combining Complete Subtree Method and Subset Difference Method," SCIS '03, pp. 221-226, 2003.

Kikuchi et al., "Modified Subset Difference Method with Reduced Strage of Secret Key at Users," SCIS '04, pp. 83-87, 2004.

Ogata et al., "Efficient Tree Based Key Management based on RSA function," SCIS '04, pp. 195-199,2004.

Asano, "Efficient Broadcast Encryption Method based on a Key Tree Structure," SCIS '03, pp. 209-214, 2003.

Kim et al., "Broadcast Encryption Schemes Suitable for Half-Rate Revo;;ation," SCIS '03, pp. 305-309, 2003.

Nojima et al., "Tree Based Key Management Using Trapdoor On-Way Functions," sels '03, pp. 131-136, 2003.

ENCRYPTED COMMUNICATION FOR SELECTIVELY DELIVERING A MESSAGE TO MULTIPLE DECRYPTING DEVICES

CROSS-REFERENCE TO RELATED APPLICATION

This application is a continuation of U.S. patent application Ser. No. 12/193,569 filed Aug. 28, 2008, which is a continuation of U.S. application Ser. No. 11/167,018 filed Jun. 24, 2005.

FIELD OF THE INVENTION

The present invention relates to an encrypted communication system, an encrypting device, a decrypting device, an encrypting method, a decrypting method, an encrypting program product, and a decrypting program product. More specifically, the present invention relates to an encrypted communication system for selectively delivering a message to multiple decrypting devices.

BACKGROUND

In recent years, distribution of digital contents is becoming active along with diffusion of broadband communication networks, and protection of such contents is an important issue.

The following documents are considered:
[Patent Document 1] Japanese Unexamined Patent Publication No. 2003-289297
[Patent Document 2] Japanese Unexamined Patent Publication No. 2003-273858
[Patent Document 3] Japanese Unexamined Patent Publication No. 2002-123429
[Patent Document 4] Japanese Unexamined Patent Publication No. 11 (1999)-187013
[Non-Patent Document 1] A. Fiat and M. Naor, "Broadcast Encryption," Crypto '93, Lecture Notes in Computer Science (LNCS) 773, pp. 480-491, 1994
[Non-Patent Document 2] D. Naor, M. Naor, and J. Lotspiech, "Revocation and Tracing Scheme for Stateless Receivers," Advances in Cryptology—Crypto 2001, Lecture Notes in Computer Science (LNCS) 2139, Springer, pp. 41-62, 2001
[Non-Patent Document 3] Matsuzaki et al, "Tree Structure Key Management Method Supporting Multiple Systems," SCIS '02, pp. 721-726, 2002
[Non-Patent Document 4] Okuaki et al, "Proposal of a Hybrid System Combining Complete Subtree Method and Subset Difference Method," SCIS '03, pp. 221-226, 2003
[Non-Patent Document 5] Kim et al., "Broadcast Encryption Schemes Suitable for Half-Rate Revocation," SCIS '03, pp. 305-309, 2003
[Non-Patent Document 6] Asano, "Efficient Broadcast Encryption Method based on a Key Tree Structure," SCIS '03, pp. 209-214, 2003
[Non-Patent Document 7] Ogata et al., "Efficient Tree Based Key Management based on RSA function," SCIS '04, pp. 195-199, 2004
[Non-Patent Document 8] Kikuchi et al., "Modified Subset Difference Method with Reduced Strage of Secret Key at Users," SCIS '04, pp. 83-87, 2004
[Non-Patent Document 9] Nojima et al., "Tree Based Key Management Using Trapdoor On-Way Functions," SCIS '03, pp. 131-136, 2003

As one of techniques for protecting the contents, broadcast encryption (hereinafter abbreviated as BE) which is an encryption method allowing only a receiver selected by a transmitter to decrypt encrypted information is applied to CPRM/CPPM and the like, for example. (See Non-Patent Document 1).

When individual keys are managed for respective decrypting devices in the BE method, the number of keys to be managed will be immense. Moreover, the information encrypted for each decrypting device needs to be included in an encrypted message. Accordingly, a message length of the encrypted message subject to broadcast is increased. To solve such a problem, there is a disclosed method of allocating keys by use of a tree structure. (See Patent Documents 1 to 4 and Non-Patent Documents 2 to 9).

Non-Patent Document 2 discloses typical BE methods applying the tree structure, namely, a complete subtree (hereinafter abbreviated as CS) method and a subset difference (hereinafter abbreviated as SD) method.

In the CS method, each decrypting device is allocated to a leaf (a terminal node) of a complete binary tree, and node keys for the respective nodes ranging from a terminal node to a root node are stored in each device. An encrypting device selects a set of complete subtrees $S_i$, which does not include a decrypting device with the decrypting of a message disabled in a terminal node thereof but includes only decrypting devices enabled to decrypt the message in the terminal nodes. Thereafter, the encrypting device encrypts a message body by use of a title key, then encrypts the title key with one or a plurality of node keys of one or a plurality of nodes respectively located on a vertex or vertices of one or a plurality of selected complete subtrees $S_i$, and then broadcasts the encrypted message including the foregoing information. Upon receipt of the encrypted message, the qualified decrypting device is able to decrypt the title key, which is encrypted with the node key for any of nodes from the terminal node to the root node corresponding to the decrypting device, and thereby to decrypt the message by use of the decrypted title key.

In the CS method, assuming that the number of nodes is N and that the number of decrypting devices with the decrypting of the message disabled (the number of decrypting devices to be disabled) is r, each decrypting device will have a key defined as log N+1. Here, the base of log is k in the case of using a k-th order tree, which is equal to 2 in the case of using a binary tree (hereinafter similarly applicable), for example. Meanwhile, a message length (the number of node keys used for encrypting the title key) will be equal to r*log(N/r) in the worst case.

In the SD method, if one of terminal nodes in a complete subtree having the node as the vertex represents a decrypting device with the decrypting of a message disabled, then a node key is further provided, associated with each of the nodes, for allowing decrypting device in the complete subtree other than the disabled decrypting device to perform decryption.

In the SD method, each decrypting device will have a key defined as $((\log N)^2+\log N)/2+1$, and the message length will be equal to 2r−1 in the worst case and 1.25r on average.

Non-Patent Document 4 discloses a method combining the CS method and the SD method. In this method, when $N=2^{15}$, the message length becomes larger than the message length in the SD method. According to Non-Patent Document 5, the message length is almost equal to N/3 when the number of disabled decrypting devices is about half of the total decrypting devices. Non-Patent Document 3 discloses a method of managing a tree structure supporting a plurality of systems by encrypting and publicizing node keys for the tree structure. In this method, an encrypting device publicizes the node keys in the number proportional to the number of nodes.

In the CS method, the number of node keys used for encrypting the title key will increase along with an increase in the number of decrypting devices with the decrypting of the message disabled. As a result, the message length increases. Meanwhile, in the SD method, although it is possible to reduce the message length as compared to the CS method, the number of node keys to be stored by each decrypting device will increase on the contrary. To enhance efficiency of the BE, there is a demand for a method which is capable of significantly reducing the message length while not increasing the number of node keys to be stored by each decrypting device in comparison with the CS method, the SD method, and other conventional techniques.

SUMMARY OF THE INVENTION

In one aspect, the invention comprises an encrypting device for encrypting a message, comprising: a node associating information generating unit for generating node associating information for associating each of a plurality of first terminal nodes in a first tree structure and a plurality of second terminal nodes in a second tree structure connecting a plurality of nodes with each of a plurality of decrypting devices corresponding to respective descendant first terminal nodes of a first decryption enabled node and on the device decryption key of the specified decrypting device, on condition that any of the nodes ranging from a first terminal node associated with the specified decrypting device to a root node of the first tree structure, and the second tree structure among a plurality of first nodes in the first tree structure, and a plurality of the second terminal nodes on the second tree structure connecting a plurality of nodes, is the first decryption enabled node wherein said decrypting devices are enabled to decrypt the encrypted message is associated with a descendent first terminal node in the first tree structure and the second tree structure, in relation to a group of said decrypting devices enabled to decrypt the encrypted message; a node extracting unit for extracting the first decryption enabled node from the first tree structure and a second decryption enabled node from the second tree structure, in which said decryption devices are enabled to decrypt the encrypted message; and a message encrypting unit for encrypting the message by use of a first node encryption key associated with the first decryption enabled node.

In another aspect, the invention comprises an encrypting device with the encrypting device corresponding to respective descendant first terminal nodes of a first decryption enabled node and on the device decryption key of the specified decrypting device, on condition that any of the nodes ranging from a first terminal node associated with the specified decrypting device to a root node of the first tree structure, and the second tree structure among a plurality of first nodes in the first tree structure, and a plurality of second terminal nodes on the second tree structure connecting a plurality of nodes, is the first decryption enabled node wherein said decrypting device enabled to decrypt the encrypted message is associated with a descendent first terminal node in the first tree structure and the second tree structure, comprises a message encrypting unit, wherein said message encrypting unit encrypts the message to be encrypted by use of a group encryption key.

In another aspect, the invention comprises an encrypting method for an encrypting device configured to encrypt a message, comprising: a node associating information generating step of generating node associating information for associating each of a plurality of first terminal nodes in a first tree structure and a plurality of second terminal nodes in a second tree structure connecting a plurality of nodes with each of a plurality of decrypting devices corresponding to respective descendant first terminal nodes of a first decryption enabled node and on the device decryption key of the specified decrypting device, on condition that any of the nodes ranging from a first terminal node associated with the specified decrypting device to a root node of the first tree structure, and the second tree structure among a plurality of first nodes in the first tree structure, and a plurality of second terminal nodes on the second tree structure connecting a plurality of nodes, is the first decryption enabled node wherein said decrypting device enabled to decrypt the encrypted message is associated with a descendent first terminal node in the first tree structure and the second tree structure, in relation to a group of said decrypting devices enabled to decrypt the encrypted message; and a message encrypting step of encrypting the message by use of a first node encryption key.

In another aspect, the invention comprises an encrypting method for an encrypting device configured to encrypt a message, wherein a public key and a secret key are predefined in relation to each of a plurality of decrypting devices corresponding to respective descendant first terminal nodes of a first decryption enabled node, on condition that any of the nodes ranging from a first terminal node associated with the specified decrypting device to a root node of the first tree structure, and the second tree structure among a plurality of first nodes in the first tree structure, and a plurality of second terminal nodes on the second tree structure connecting a plurality of nodes, is the first decryption enabled node wherein said decrypting device enabled to decrypt the encrypted message is associated with a descendent first terminal node in the first tree structure and the second tree structure, for decrypting an encrypted message, the encrypting method comprising a message encrypting step of encrypting the message by use of a group encryption key.

In another aspect, the invention comprises an encrypting method for an encrypting device configured to encrypt a message, comprising: a tree structure storing step of storing a plurality of types of tree structures configured to apply each of a plurality of decrypting devices corresponding to respective descendant first terminal nodes of a first decryption enabled node and on the device decryption key of the specified decrypting device, on condition that any of the nodes ranging from a first terminal node associated with the specified decrypting device to a root node of a first tree structure, and a second tree structure among a plurality of first nodes in the first tree structure, and a plurality of second terminal nodes on the second tree structure connecting a plurality of nodes, is the first decryption enabled node wherein said decrypting device enabled to decrypt the encrypted message is associated with a descendent first terminal node in the first tree structure and the second tree structure, as a terminal node and to connect a plurality of nodes; a tree structure selecting step of selecting a plurality of the configured types of tree structures based on a set of said decrypting devices enabled to decrypt the encrypted message; a node extracting step of extracting a set of decryption enabled nodes; and a message encrypting step of outputting a plurality of said encrypted messages by encrypting the message.

These and other features, aspects and advantages of the present invention will become better understood with reference to the following drawings, description and claims.

BRIEF DESCRIPTION OF THE DRAWINGS

For a more complete understanding of the present invention and the advantages thereof, reference is now made to the following description taken in conjunction with the accompanying drawings.

DETAILED DESCRIPTION OF THE INVENTION

Figure 1:
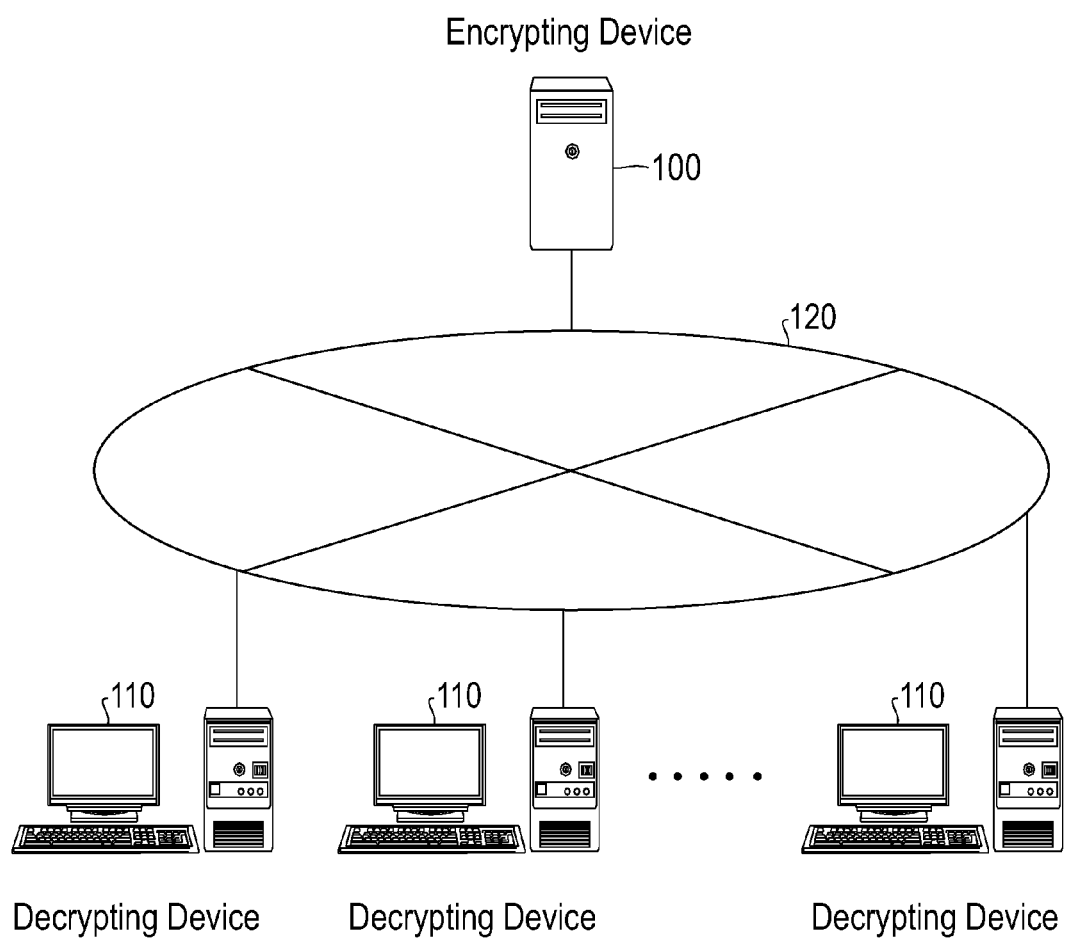
FIG. 1 is a view showing a configuration of an encrypted communication system 10 according to an embodiment of the present invention.

The present invention may provide encrypted communication systems, encrypting devices, decrypting devices, encrypting and decrypting methods, encrypting and decrypting program products, which are capable of solving the foregoing problems. These may be attained by combinations of characteristics as set forth in the independent claims defined in the scope of claims. The dependent claims herein may define more advantageous examples of the present invention.

In an example embodiment, the present invention may provide an encrypted communication system having an encrypting device for encrypting a message and a plurality of decrypting devices for decrypting the encrypted message. Here, the encrypting device may include: a node associating information generating unit for generating node associating information configured to associate a plurality of terminal nodes in the first tree structure connecting a plurality of nodes respectively with the plurality of decrypting devices in relation to a group of the decrypting devices enabled to decrypt the encrypted message; a node extracting unit for extracting the first decryption enabled node, in which aforementioned decryption devices enabled to decrypt the encrypted message are associated with the descendant first terminal nodes and aforementioned decryption devices with the decrypting of the encrypted message disabled are not associated with any of the descendant first terminal nodes, in the first tree structure with which the plurality of decrypting devices are associated by the node associating information; and a message encrypting unit for encrypting the message by use of the first node encryption key associated with the first decryption enabled node.

Meanwhile, in example embodiments each of the decrypting devices may include: a node associating information acquiring unit for acquiring the node associating information generated in relation to the group of the decrypting devices enabled to decrypt the encrypted message; a terminal node specifying unit for specifying the first terminal node associated with the decrypting device based on the node associating information; and a message decrypting unit for decrypting the encrypted message by use of the first node decryption key corresponding to the first decryption enabled node when any of the nodes ranging from the first terminal node associated with the decrypting device to the root node of the first tree structure is the first decryption enabled node. The first aspect of the present invention also may provide an encrypting device, a decrypting device, an encrypting method, a decrypting method, an encrypting program product, a decrypting program product, and a recording medium related to the described encrypted communication system.

In another example embodiment, the present invention may provide another encrypted communication system having an encrypting device for encrypting a message and a plurality of decrypting devices for decrypting the encrypted message, in which a public key and secret key may be predefined in relation to each of the decrypting devices. Here, the encrypting device may include a message encrypting unit for encrypting the message by use of a group encryption key based on the product of the secret keys corresponding to the respective decrypting devices which do not belong to a group of the decrypting devices, among the plurality of decrypting devices, enabled to decrypt the encrypted message. Meanwhile, each of the decrypting devices may include: a device decryption key storing unit for storing a device decryption key of the decrypting device determined based on the product of the secret keys corresponding to the decrypting devices, among the plurality of decrypting devices, other than the decrypting device; a group decryption key generating unit for generating a group decryption key for the encrypted message based on the product of the secret keys corresponding to the decrypting devices not belonging to a group of the decrypting devices enabled to decrypt the encrypted message, the group decryption key being generated based on the public keys corresponding to the respective decrypting devices, other than the relevant decrypting device, belonging to the group of the decrypting devices enabled to decrypt the encrypted message and on the device decryption key of the relevant decrypting device; and a message decrypting unit for decrypting the encrypted message by use of the group decryption key. The second aspect of the present invention also may provide an encrypting device, a decrypting device, an encrypting method, a decrypting method, an encrypting program, a decrypting program, and a recording medium related to the described encrypted communication system.

In an example embodiment, the present invention may provide still another encrypted communication system having an encrypting device for encrypting a message and a plurality of decrypting devices for decrypting the encrypted message. Here, the encrypting device may include: a tree structure storing unit for storing a plurality of tree structures with a plurality of nodes connected together while defining each of the plurality of decrypting devices as a terminal node; a tree structure selecting unit for selecting one of the tree structures based on a set of the decrypting devices enabled to decrypt the encrypted message; a node extracting unit for extracting a set of decryption enabled nodes in terms of the selected tree structure, each of the decryption enabled nodes not containing the decrypting device with the decrypting of the encrypted message disabled in descendant terminal nodes but containing the decrypting device enabled to decrypt the encrypted message in a descendant terminal node of any of the nodes; and a message encrypting unit for outputting a plurality of encrypted messages in which the message is encrypted by use of respective node encryption keys associated with respective decryption enabled nodes belonging to the selected set of the decryption enabled nodes. Meanwhile, each of the decrypting devices may include: a node specifying unit for specifying the selected decryption enabled node in the tree structure as a pool for selecting the set of nodes among nodes located on a path ranging from the terminal node corresponding to the decrypting device to the root node; a node decryption key acquiring unit for acquiring a node decryption key associated with the decryption enabled node specified by the node specifying unit in the tree structure as a pool for selecting the set of decryption enabled nodes; and a message decrypting unit for decrypting the encrypted message encrypted by the node encryption key associated with the decryption enabled node specified by the node specifying unit while using the acquired node decryption key. The third aspect of the present invention also may provide an encrypting device, a decrypting device, an encrypting method, a decrypting method, an encrypting program, a decrypting program, and a recording medium related to the described encrypted communication system.

Note that the above-described outlines of the invention do not enumerate all necessary features of the present invention, and that subcombinations of these groups of features may also constitute the present invention. It should be realized that according to the present invention, it is possible to reduce a message length of an encrypted message when selectively transmitting the message to a plurality of decrypting devices.

Now, the present invention will be described by way of advantageous embodiments. However, it is to be understood that the following embodiments do not limit the invention as defined in the appended claims, and that all the combinations of the features as explained in the embodiment are not always essential to constitute the solution of the invention.

FIG. 1 shows a configuration of an encrypted communication system 10 according to an embodiment of the present invention. The encrypted communication system 10 may include an encrypting device 100, a plurality of decrypting devices 110, and a network 120. The encrypted communication system 10 may realize broadcast encryption which is capable of reducing a message length of an encrypted message to be transmitted from the encrypting device 100 to decrypting devices 110 while suppressing the number of keys to be stored in the respective decrypting devices 110.

The encrypting device 100 may encrypt a message so as to allow only a predefined decrypting device 110 out of all the decrypting devices 110 to perform decryption, and thereby may output an encrypted message. Each of the decrypting devices 110 decrypts the encrypted message when decryption of the encrypted message is enabled. Here, the decrypting device 110 may be an information processing device such as a personal computer (PC), a personal digital assistant (PDA), a cellular telephone or a home information appliance. Moreover, two or more decrypting devices 110 may be realized by a single computer. Specifically, such a computer may function as the first decrypting device 110 when the first user uses the computer and as the second decrypting device 110 when the second user uses the computer, for example. The network 120 may relay communication between the encrypting device 100 and the decrypting devices 110.

In the above-described configuration, the message may be a digital content, for example, which may be encrypted by the encrypting device 100 and transmitted to decrypting devices 110. Instead, the message may be information recorded in a recording medium such as a CD or a DVD. In this case, the message may be encrypted by the encrypting device 100 and recorded in the recording medium, and will be read out and decrypted by the decrypting device enabled to perform decryption.

Figure 2:
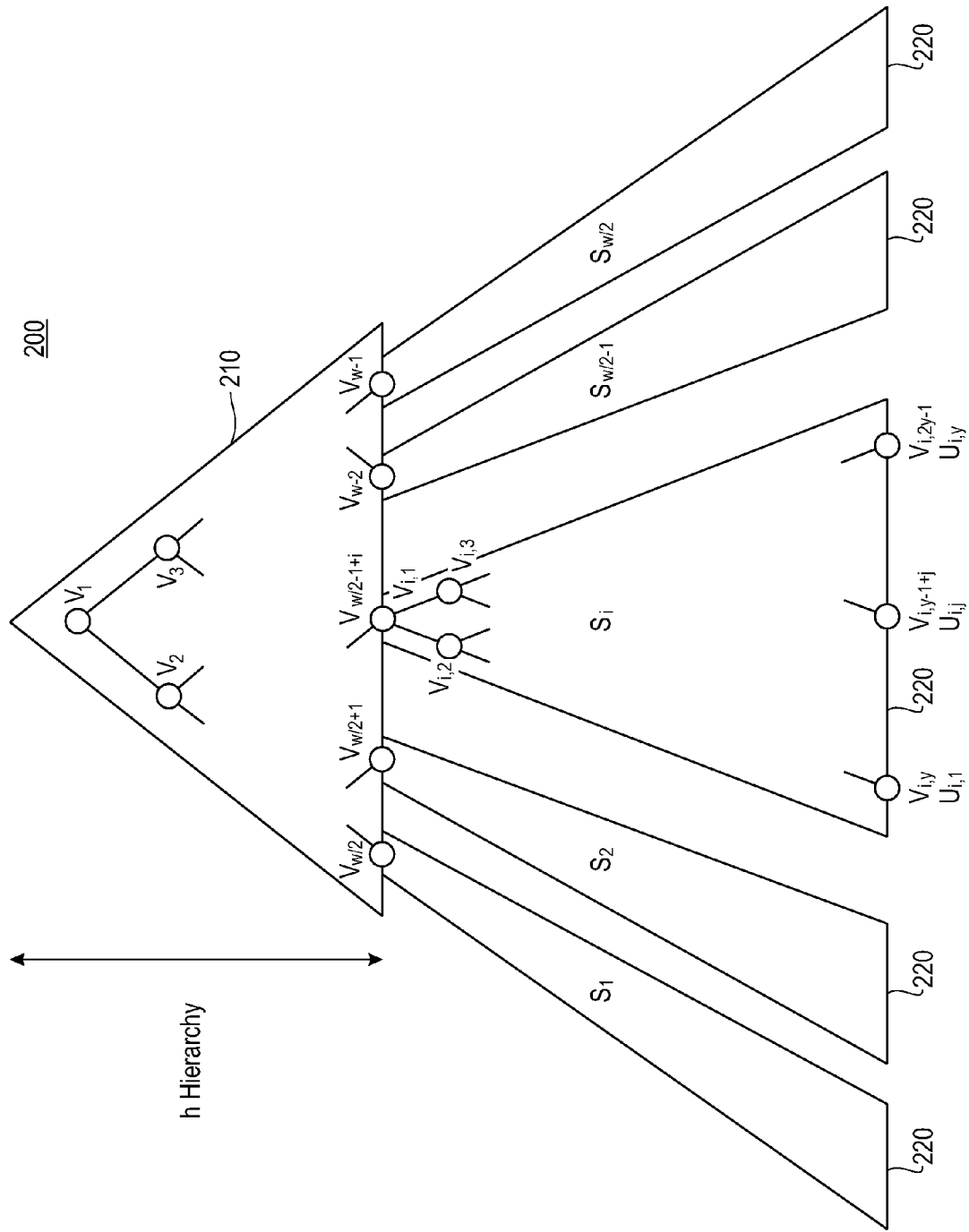
FIG. 2 is a view showing a tree structure for managing keys by the encrypted communication system 10 according to the embodiment of the present invention.

FIG. 2 shows a tree structure for key management by the encrypted communication system 10 according to this embodiment. The encrypted communication system 10 according to this embodiment may manage decryption keys to be used in decryption of the encrypted message by use of a tree 200 shown in FIG. 2.

The tree 200 is a tree structure formed by defining each of the plurality of decrypting devices 110 as each terminal node (a leaf) and by connecting a plurality of nodes. To be more precise, the tree 200 may be formed by connecting one or more child nodes to one parent node starting from the root node $v_1$, and each decrypting device 110 may be associated with each terminal node which does not have a child node. This embodiment will be described based on an example where the tree 200 is a binary tree. However, the tree may adopt any other tree structure. In the following, description will be made on an example where the total number of the decrypting device 110 is equal to N (N is a power of two number).

The tree 200 may include a higher-level tree 210 and a plurality of lower-level subtrees 220. The higher-level tree 210 may have a tree structure in which the root node of the tree 200 may be defined as the root node and respective root nodes of the plurality of lower-level subtrees 220 may be connected as a plurality of second terminal nodes. The higher-level tree 210 in this embodiment may include nodes in a higher-level portion starting from the first level to an h-th level ($1 \leq h \leq \log N-1$) of the tree 200, and codes from $v_1$ to $v_{w-1}$ may be allocated to the respective nodes while giving priority to the width (on the condition that $w=2^h$). Moreover, mutually different node keys $L_j$ ($j=1, 2, \ldots, w-1$) may be allocated to the respective nodes. These node keys may be used as encryption keys and as decryption keys for a message. Alternatively, it may also be possible to allocate asymmetric sets of encryption keys and decryption keys to the respective nodes.

Each of the lower-level subtrees 220 may have a tree structure in which the plurality of decrypting devices 110 associated with the lower-level subtrees 220 are respectively defined as first terminal nodes and the plurality of nodes may be connected. Each of the plurality of lower-level subtrees 220 (which will be indicated as $S_i$ ($i=1, 2, \ldots, w/2$)) may apply the $v_{w/2-1+i}$, which is a terminal node of the higher-level tree 210, as the root node. Nodes from $v_{i,1}$ to $v_{i,2y-1}$ may be allocated to the respective nodes of an i-th (i=1, 2, . . . , w/2) lower-level subtree 220 while giving priority to the width (on the condition that y=2N/w). Moreover, mutually different node keys $L_{i,l}$ (l=1, 2, . . . , 2y−1) may be allocated to the respective nodes. These node keys may be used as encryption keys and as decryption keys for a message. Meanwhile, the respective decrypting devices 110 (which will be indicated as $u_{i,j}$ (j=1, 2, . . . , y)), which may be associated with the lower-level subtrees 220, may be associated with respective terminal nodes $v_{i,y}, \ldots, v_{i,2y-1}$ of the lower-level subtrees 220.

The encrypting device 100 may preset w/2 pieces of groups of prime numbers $(p_i, q_i)$, which are sufficiently large and mutually different, and thereby prepares $n_i = p_i q_i$. The $n_i$ factor may be used as the modulus in an encryption system of the lower-level subtree 220 of $S_i$. Moreover, a public key $e_j$ and a secret key $d_{i,j}$ may be predefined in relation to each of the decrypting devices 110. Here, the public keys $e_j$ (j=1 . . . , y) may be y pieces of mutually different prime numbers, which may be equal to or below $\min_i(n_i)$. Meanwhile, N groups of $(e_j, d_{i,j})$ (i=1, 2, . . . , w/2, j=1, 2, . . . , y) may constitute groups of public keys and encryption keys in an RSA encryption system applying the $n_i$ factor as the modulus.

Then, the encrypting device 100 may publicize all $e_j$ factors to the respective decrypting devices 110 and secretly retain the $d_{i,j}$ factors. Here, each of the decrypting devices 110 may store all the $e_j$ factors in advance or retain a program for generating the $e_j$ factors. Moreover, the $n_i$ factor corresponding to the lower-level subtree 220 connected to a decrypting device 110 may be preset in the decrypting device 110.

The decrypting device 110 associated with the lower-level subtree 220 indicated by $S_i$ may secretly retains node keys for h pieces of nodes on a path from the root node of the lower-level subtree 220 to the root node of the tree 200 and device keys (device decryption keys) of the decrypting device 110 as defined in the following formula (1):

[Formula 1]

$$I_{i,j} = A^{T_i/d_{i,j}} \bmod n_i \quad (1)$$

provided that $$A_i = L_{w/2+i-1} (\in Z_{n_i}^*),$$

$$T_i = \prod_{k=1}^{y} d_{i,k}$$

These device keys $I_{i,j}$ may also be used as the node keys for the terminal nodes of the lower-level subtree 220.

In the above-described configuration, each of the decrypting devices 110 can use node decryption keys corresponding to the respective nodes ranging from the terminal node of the lower-level subtree 220 associated with the decrypting device 110 to the root node of the tree 200. To be more precise, the decrypting device 110 may store the node decryption keys corresponding to the nodes in the higher-level tree 210 on this path in advance. Meanwhile, the decrypting device 110 may generate the node decryption keys corresponding to the nodes in the lower-level subtree 220 on this path by use of the above-described device keys (the device decryption keys). In the meantime, each of the decrypting devices 110 cannot use the node decryption keys corresponding to other nodes.

The encrypting device 100 selects a node among the respective nodes in the tree 200, which includes the decrypting device 110 enabled to decrypt an encrypted message in descendant terminal nodes and may not include the decrypting device 110 with the decrypting thereof disabled in the descendant terminal nodes, as a decryption enabled node. Then, the encrypting device 100 may encrypt a message by use of a node encryption key corresponding to the decryption enabled node. In this way, the encrypting device 100 can generate the encrypted message which can be decrypted only by the decrypting device 110 corresponding to the descendant terminal node of the decryption enabled node. Here, the encrypting device 100 may select multiple decryption enabled nodes and transmit a plurality of encrypted messages respectively encrypted by use of the node encryption keys corresponding to these decryption enabled nodes to the respective decrypting devices 110. In this case, each of the decrypting devices 110 can decrypt the encrypted message encrypted by one of the node encryption keys as long as the decrypting device 110 can use the node decryption key corresponding to any of the node encryption keys.

For the purpose of significantly reducing the number of node encryption keys used for encrypting the message, the encrypting device 100 according to this embodiment dynamically may select as to which terminal nodes of the lower-level subtrees 220 the plurality of decrypting devices 110 corresponding to the respective lower-level subtrees 220 are associated with, depending on a group of decrypting devices 110 enabled to decrypt the encrypted message. In this way, the encrypting device 100 can sort the plurality of decrypting devices 110 in the lower-level subtrees 220, minimize the number of node encryption keys used for encryption, and thereby reduce the message length.

Figure 3:
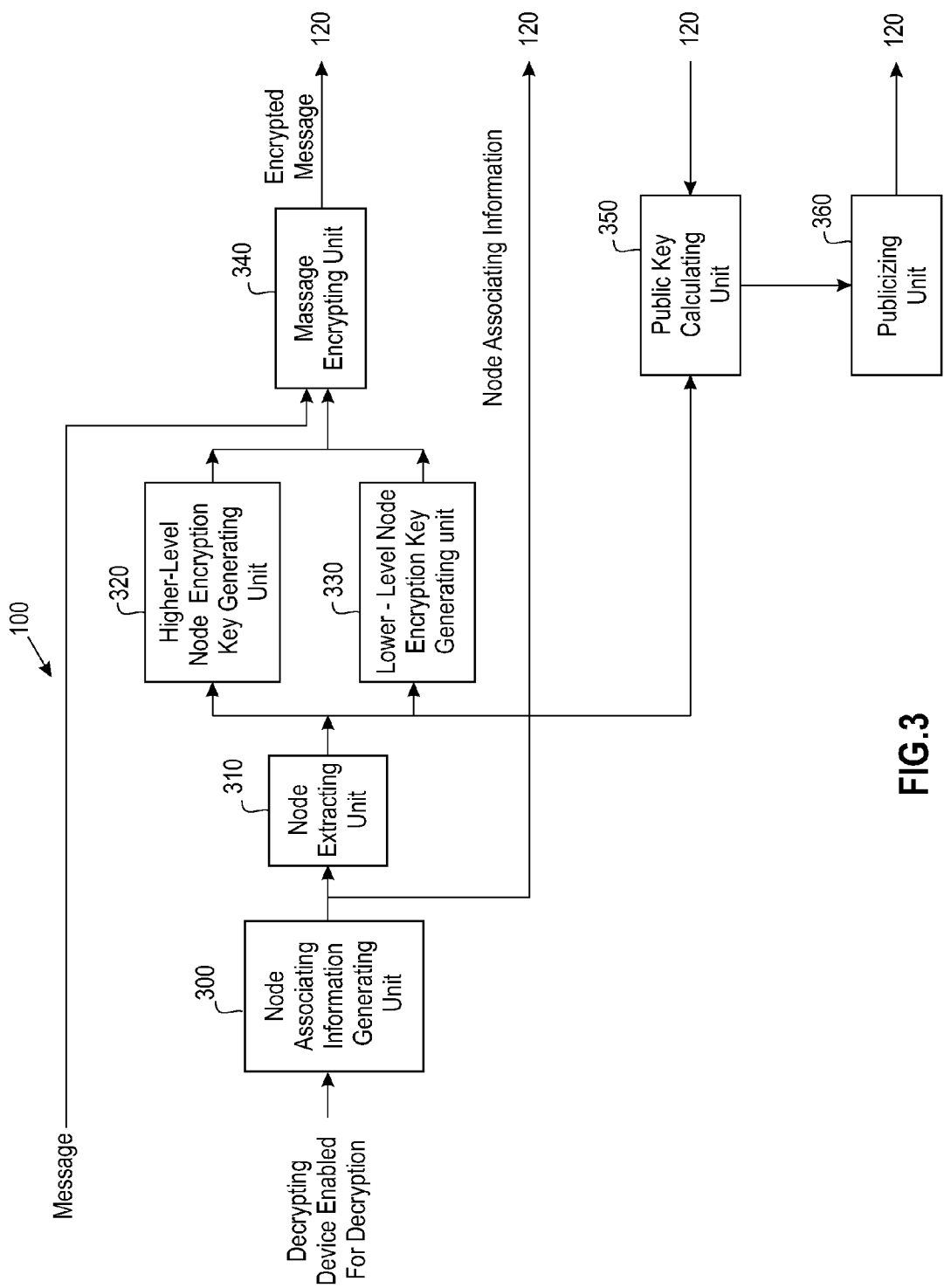
FIG. 3 is a view showing a configuration of an encrypting device 100 according to the embodiment of the present invention.

FIG. 3 shows a configuration of the encrypting device 100 according to this embodiment. The encrypting device 100 can receive the message and information for identifying the group of decrypting devices 110 enabled for decryption, then may generate the encrypted message which can be decrypted only by these decrypting devices 110, and then may transmit the encrypted message to the decrypting devices 110. The encrypting device 100 may include a node associating information generating unit 300, a node extracting unit 310, a higher-level node encryption key generating unit 320, a lower-level node encryption key generating unit 330, and a message encrypting unit 340.

The node associating information generating unit 300 may receive designation of the group of decrypting devices 110 enabled for decryption, and may generate node associating information for associating decrypting devices 110 with terminal nodes in terms of each message concerning each of the lower-level subtrees 220. The node extracting unit 310 may store the tree structures of the plurality of lower-level subtrees 220 and the tree structure of the higher-level tree 210 to which the respective root nodes of the plurality of lower-level subtrees 220 are connected as the plurality of terminal nodes. When receiving the node associating information, the node extracting unit 310 can associate the respective lower-level subtrees 220 with the respective decrypting devices 110. Then, the node extracting unit 310 can extract the set of nodes including decrypting devices 110 enabled to decrypt the encrypted message in the descendant terminal nodes thereof and not including a decrypting device 110 with decryption disabled in the descendant terminal nodes thereof as the set of decryption enabled nodes.

The higher-level node encryption key generating unit 320 can generate the node encryption key corresponding to the decryption enabled node in the higher-level tree 210 among the extracted decryption enabled nodes. The lower-level node encryption key generating unit 330 may be an example of the node encryption key generating unit according to the present invention, which can generate the node encryption key corresponding to the decryption enabled node in any of the lower-level subtrees 220 among the extracted decryption enabled nodes. The message encrypting unit 340 can encrypt the message by use of the node encryption key corresponding to each of the decryption enabled nodes to generate the encrypted message, and then can transmit the encrypted message to the decrypting devices 110. The encrypting device 100 may further include a public key calculating unit 350 and a publicizing unit 360.

The public key calculating unit 350 can calculate the product of the public keys $e_j$ which are used by the respective decrypting devices 110 enabled to decrypt the encrypted message for generating the node decryption keys. The publicizing unit 360 may publicize the product of the public keys calculated by the public key calculating unit 350 to the decrypting devices 110.

Figure 4:
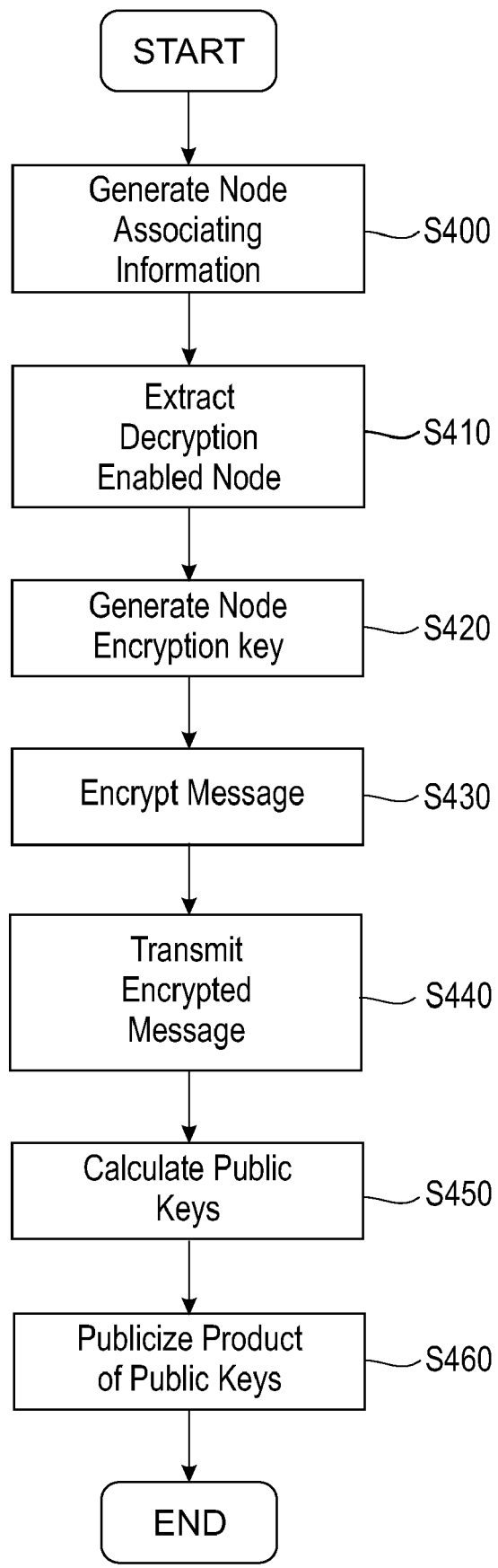
FIG. 4 is a view showing an operational flow of the encrypting device 100 according to the embodiment of the present invention.

FIG. 4 shows an operational flow of the encrypting device 100 according to this embodiment. Firstly, the node associating information generating unit 300 can receive designation of the group of decrypting devices 110 enabled for decryption. Then, concerning each of the lower-level subtrees 220 including at least one decrypting device 110 enabled for decryption, the node associating information generating unit 300 can generate the node associating information for associating each of the plurality of decrypting devices 110 with each of the plurality of terminal nodes in the lower-level subtrees 220 in relation to the group of decrypting devices 110 enabled to decrypt the encrypted message (S400). Here, the node associating information generating unit 300 can generate the node associating information in terms of each of the lower-level subtrees 220 so as to minimize the number of the decryption enabled nodes of the lower-level subtrees 220 to be extracted by the node extracting unit 310.

To be more precise, the node associating information generating unit 300 can generate $\tau_i(\ldots)$ indicating a sorting method as the node associating information concerning $S_i$, which may represent the lower-level subtree 220 including at least one decrypting device 110 enabled for decryption, and then can publicize the information to the decrypting devices 110. Here, $\tau_i(\ldots)$ may be a bijective function from a set $\{1, \ldots, y\}$ to $\{1, \ldots, y\}$, which may indicate that the decrypting device 110 indicated by $u_{i,j}$ may be associated with a $\tau_i(j)$-th terminal node of $S_i$. Alternatively, the node associating information generating unit 300 may generate a bitmap as the node associating information, in which enabling or disabling of decryption of the encrypted message may be represented by a flag in terms of each of the plurality of decrypting devices 110. By using this node associating information, the node associating information generating unit 300 can associate the plurality of decrypting devices 110 dynamically to the respective terminal nodes for each message. Moreover, by continuously arranging decrypting devices 110 enabled for decryption on the left side (the side closer to $v_{i,y}$) in the lower-level subtree 220, for example, the node associating information generating unit 300 can reduce the node number of all the sets of decryption enabled nodes including decrypting devices 110, which may be enabled to decrypt the encrypted message, as descendants in the lower-level subtrees 220.

Next, the node extracting unit 310 may extract the set of decryption enabled nodes in the tree 200 associated with the plurality of decrypting devices 110 by the node associating information, in which decrypting devices 110 enabled to decrypt the encrypted message may be associated with the descendant terminal nodes and a decrypting device 110 with the decrypting of the encrypted message disabled may not be associated with any of the descendant terminal nodes (S410). In this case, the node extracting unit 310 may extract the set of decryption enabled nodes to minimize the number of decryption enabled nodes among the sets of decryption enabled nodes in which all the decrypting devices 110 enabled to decrypt the encrypted message are associated with the descendant terminal node of any of the decryption enabled nodes.

Here, when decrypting devices 110 corresponding to all the terminal nodes connected to at least one lower-level subtree 220 may be enabled to decrypt the encrypted message, the node extracting unit 310 extracts the decryption enabled node, in which the root node of the lower-level subtree 220 may be connected as the descendant terminal node and the root node of a lower-level subtree 220 having a terminal node associated with the decrypting device 110 with the decrypting of the encrypted message disabled may not be connected as the descendant terminal code. In this way, when (on condition that) all the decrypting devices 110 connected to the lower-level subtree 220 may be enabled for decryption, it may be possible to reduce calculation costs required for the respective decrypting devices 110 to generate the respective node decryption keys by tracing numerous nodes from the terminal node of the lower-level subtree 220.

Next, the higher-level node encryption key generating unit 320 and the lower-level node encryption key generating unit 330 can generate the node encryption keys respectively corresponding to the extracted decryption enabled nodes (S420). Specifically, the higher-level node encryption key generating unit 320 generates the node encryption keys corresponding to the decryption enabled nodes in the higher-level tree 210 out of the extracted decryption enabled nodes. For example, the higher-level node encryption key generating unit 320 may generate the node encryption keys by use of a one-way function with trapdoor as disclosed in Non-Patent Document 9. Alternatively, the higher-level node encryption key generating unit 320 may store the node encryption keys corresponding to all the nodes in the higher-level tree 210 in advance and select node encryption keys in relation to the extracted decryption enabled nodes.

Meanwhile, the lower-level node encryption key generating unit 330 can generate a node encryption key corresponding to the decryption enabled node in any of the lower-level subtrees 220 out of the extracted decryption enabled nodes. The lower-level node encryption key generating unit 330 according to this embodiment can generate the node encryption key $L_{i,j}$ for the decryption enabled node $v_{i,j}$ in the lower-level subtree 220 of $S_i$ by use of the following formula (2):

[Formula 2]

$$L_{i,\lambda} = A_i^{T_i/\alpha_{i,\lambda}} \bmod n_i$$

provided that $$\alpha_{i,\lambda} = \Pi_{k \in U_{i,\lambda}} d_{i,k} \quad (2)$$

Here, $U_{i,j}$ may be a set of all the decrypting devices 110 ($u_{i,j}$) connected to the subtree applying the decryption enabled node as the root node in terms of j after the association between the respective decrypting devices 110 and the respective terminal nodes may be modified by the node associating information. That is, the lower-level node encryption key generating unit 330 can generate the node encryption key $L_{i,j}$ based on the product $T_i/\alpha_{i,j}$ of the secret keys $d_{i,j}$ corresponding to the respective decrypting devices 110 not associated with the respective descendant terminal nodes of the decryption enabled node out of the plurality of decrypting devices 110 associated with the lower-level subtree 220. To be more precise, the lower-level node encryption key generating unit 330 can find the modulus relative to $n_i$ of a value obtained by raising a predefined node encryption key corresponding to a terminal node of the higher-level tree 210 by the product $T_i/\alpha_{i,j}$ of the secret keys corresponding to the respective decrypting devices 110 associated with the descendant terminal nodes of the decryption enabled node, and thereby can generate the node encryption key based on the raised value.

Next, the message encrypting unit 340 can encrypt the message by use of the node encryption key associated with the decryption enabled node (S430). Specifically, the message encrypting unit 340 may generate one encrypted message or a plurality of encrypted messages by respectively encrypting the message while using the node encryption keys corresponding to the respective decryption enabled nodes which belong to the set of extracted decryption enabled nodes. Here, each of the encrypted messages may be encrypted either by use of the node encryption key associated with the decryption enabled node in any of the lower-level subtrees 220 or by use of the node encryption key associated with the decryption enabled node in the higher-level tree 210.

To be more precise, the message encrypting unit 340 can determine a title key K for encrypting a message M, and can generate a broadcast message containing the following content by use of the node encryption keys $L_{s1}, \ldots, L_{sm}$ corresponding to a set of decryption enabled nodes $\{s_1, \ldots, s_m\}$:

[Formula 3]

$$\langle [s_1, K, s_m, E_{L_{s_1}}(K), K, E_{L_{s_m}}(K)], F_K(M) \rangle \quad (3)$$

Note that $E_{Lx}(K)$ may be a function for encrypting the title key K with the node encryption key Lx, and that $F_K(M)$ may be a function for encrypting the message M with the title key K. The message indicated in the formula (3) may include node numbers $s_1, \ldots, s_m$ of the respective decryption enabled nodes belonging to the set of decryption enabled nodes, the title key encrypted by the node encryption key $L_{s1}, \ldots$, the title key encrypted by the node encryption key $L_{sm}$, and the message M encrypted by the title key. As described above, by encrypting the message M with the title key K and encrypting the title key K with the node encryption key $L_{s1}$, the message may be indirectly encrypted by the node encryption key $L_{s1}$.

Next, the message encrypting unit 340 can output the broadcast message indicated in the formula (3) by means of transmission to all the decrypting devices 110 (S440).

Next, the public key calculating unit 350 can calculate the product of the public keys $e_j$ used by the respective decrypting devices 110 enabled to decrypt the encrypted message for generating the node decryption keys (S450). To be more precise, the public key calculating unit 350 can calculates the product $\beta_{i,l}$ of the public keys corresponding to each of the decrypting devices 110 other than the decrypting devices 110 corresponding to the respective descendant terminal nodes of the decryption enabled node $v_{i,l}$ in terms of each of the decryption enabled nodes in the lower-level subtrees 220 extracted by the node extracting unit 310 in relation to each of the decrypting devices 110 (see the following formula (4)):

[Formula 4]

$$\beta_{i,\lambda} = \Pi_{k \in U_{i,\lambda}} e^k \quad (4)$$

Next, the publicizing unit 360 can publicize the product of the public keys calculated by the public key calculating unit 350 to the plurality of decrypting devices 110 (S460). In this way, it may become unnecessary for each of the decrypting devices 110 to calculate the product of the public keys, and it may thereby be possible to reduce calculation loads on the decrypting devices 110.

According to the above-described encrypting device 100, it may be possible to reduce the number of node encryption keys used for encryption significantly by dynamically reorganizing the association of the decrypting devices 110 with respect to the terminal nodes of the lower-level subtrees 220 in relation to the set of decrypting devices 110 enabled to decrypt the encrypted message.

In the case of distributing a program such as a television program, the encrypted communication system 10 shown above sequentially can distribute a plurality of messages constituting the program. Here, when the present invention is applied to allow a content distribution company to distribute a pay-per-view (PPV) program, for example, the encrypting device 100 may have to newly permit the decrypting device 110 of a user, who has paid a service charge in the course of the program, to decrypt encrypted messages. To realize this, the encrypting device 100 can modify the set of decryption enabled nodes.

In this case, the decryption keys may need to be recalculated by many decrypting devices 110 if the set of decryption enabled nodes is largely modified. Therefore, the node associating information generating unit 300 may attempt to modify the set of decryption enabled nodes as little as possible even when a new user is added. Specifically, in the case of outputting the first encrypted message and subsequently outputting the second encrypted message having a set of decrypting devices 110 enabled to decrypt encrypted messages different from the set in the first encrypted message, the node associating information generating unit 300 can generate the node associating information so as to minimize the number of decrypting devices 110 subject to modification of the decryption keys. To be more precise, the node associating information generating unit 300 can generate the node associating information in which the existing decrypting device 100 enabled to decrypt the first encrypted message and enabled to decrypt the second encrypted message may be associated with the same terminal node as the terminal node associated in encryption of the first encrypted message. In this way, the node associating information generating unit 300 can minimize the number of decrypting devices 110 subject to modification of the decryption keys.

In addition, the node associating information generating unit 300 can generate the node associating information which minimizes the number of decryption enabled nodes to be extracted by the node extracting unit 310 in relation to the second encrypted message. For example, the node associating information generating unit 300 may arrange the decrypting devices 110 enabled for decryption continuously on the left side (the side closer to $v_{i,y}$) in a lower-level subtree 220, and can arrange the decrypting device 110 newly enabled for decryption adjacently on the right side of the decrypting devices 110 which have been already enabled for decryption. In this way, it may be possible to minimize the number of decryption enabled nodes.

Figure 5:
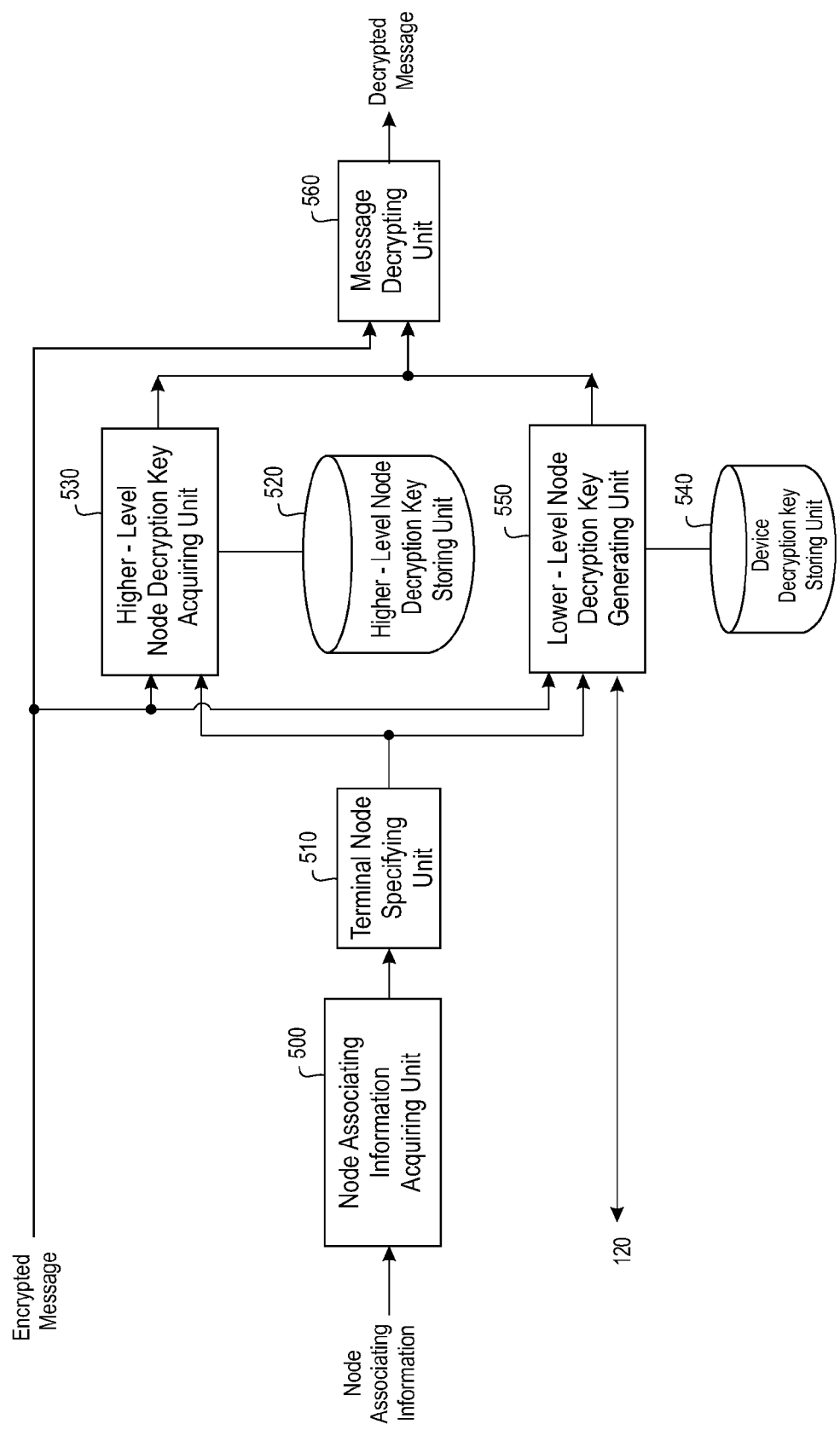
FIG. 5 is a view showing a configuration of a decrypting device 110 according to the embodiment of the present invention.

FIG. 5 shows a configuration of the decrypting device 110 according to this embodiment. The decrypting device 110 can receive and decrypt the encrypted message encrypted by the encrypting device 100. The decrypting device 110 may include a node associating information acquiring unit 500, a terminal node specifying unit 510, a higher-level node decryption key storing unit 520, a higher-level node decryption key acquiring unit 530, a device decryption key storing unit 540, a lower-level node decryption key generating unit 550, and a message decrypting unit 560.

The node associating information acquiring unit 500 may acquire the node associating information used for encrypting the encrypted message from the encrypting device 100. The terminal node specifying unit 510 may specify a terminal node of the lower-level subtree 220 corresponding to the decrypting device 110 based on the node associating information. The higher-level node decryption key storing unit 520 may be an example of a node decryption key storing unit according to the present invention, which stores the respective node decryption keys corresponding to the nodes ranging from the terminal node of the higher-level tree 210 corresponding to the root node of the lower-level subtree 220, in which the decrypting device 110 may be associated with the terminal node thereof, to the root node of the higher-level tree 210. The higher-level node decryption key acquiring unit 530 may acquire the node decryption key corresponding to the decryption enabled node from the higher-level node decryption key storing unit 520 when the encrypted message may be encrypted by use of the node encryption key corresponding to the decryption enabled node in the higher-level tree 210.

The device decryption key storing unit 540 can store the device decryption key $I_{i,j}$ of the decrypting device, which may be shown in the formula (1). As shown in the formula (1), the device decryption key $I_{i,j}$ may be determined based on the product $T_i/d_{i,j}$ of the secret keys $d_{i,j}$ corresponding to the decrypting devices 110 other than the relevant decrypting device 110 out of the plurality of decrypting devices 110 associated with the lower-level subtree 220 to which the relevant decrypting device 110 may belong. To be more precise, the device decryption key $I_{i,j}$ may be determined by finding the modulus relative to $n_i$ of the value obtained by raising the node key of the terminal node of the higher-level tree 210 being the predetermined number by the product $T_i/d_{i,j}$ of the secret keys. The lower-level node decryption key generating unit 550 can generate a node decryption key corresponding to the decryption enabled node based on the device decryption key $I_{i,j}$ when the encrypted message may be encrypted by use of the node encryption key corresponding to the decryption enabled node in the lower-level subtree 220. The message decrypting unit 560 can decrypt the encrypted message by use of the node decryption key either acquired by the higher-level node decryption key acquiring unit 530 or generated by the lower-level node decryption key generating unit 550.

Figure 6:
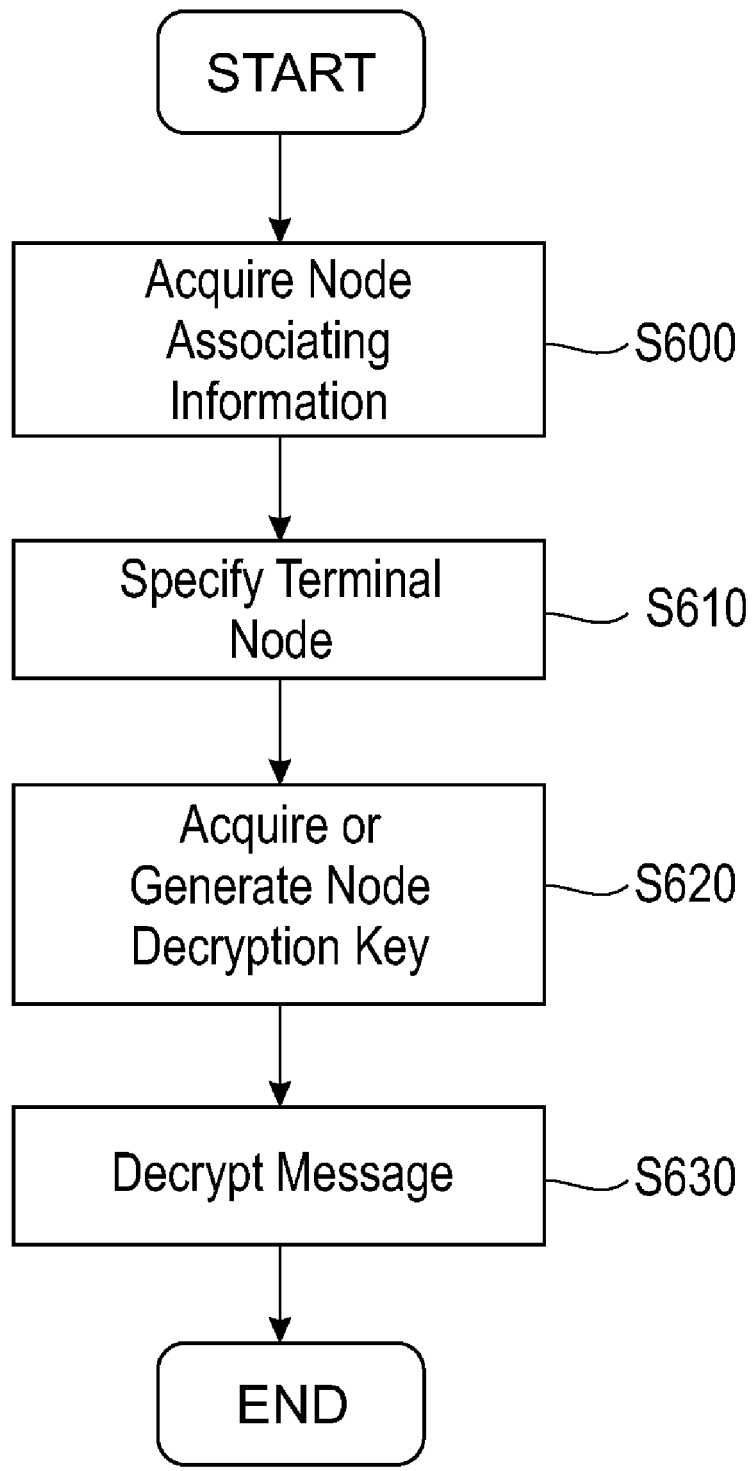
FIG. 6 is a view showing an operational flow of the decrypting device 110 according to the embodiment of the present invention.

FIG. 6 shows an operational flow of the decrypting device 110 according to this embodiment. The node associating information acquiring unit 500 may acquire the node associating information from the encrypting device 100, which may be generated in relation to the group of decrypting devices 110 enabled to decrypt the encrypted message (S600). Next, the terminal node specifying unit 510 can specify the terminal node associated with the decrypting device 110 in the lower-level subtree 220 corresponding to the decrypting device 110 based on the node associating information (S610).

Next, the higher-level node decryption key acquiring unit 530 or the lower-level node decryption key generating unit 550 may either acquire the node decryption key corresponding to the node encryption key used for encrypting the encrypted message from the higher-level node decryption key storing unit 520 or generate the node decryption key based on the device decryption key (S620). Specifically, when an encrypted message included in the message broadcast by the encrypting device 100 may be encrypted by a node encryption key of the higher-level tree 210, the higher-level node decryption key acquiring unit 530 may acquire the node decryption key corresponding to the node encryption key from the higher-level node decryption key storing unit 520. To be more precise, when any of the nodes ranging from the terminal node of the higher-level tree 210 corresponding to the root node of the lower-level subtree 220, in which the decrypting device 110 may be associated with a terminal mode thereof, to the root node of the higher-level tree 210 is the decryption enabled node, the higher-level node decryption key acquiring unit 530 can read the node decryption key corresponding to the decryption enabled node out of the higher-level node decryption key storing unit 520.

In the meantime, when an encrypted message included in the message broadcast by the encrypting device 100 is encrypted by a node encryption key of the lower-level subtree 220, the lower-level node decryption key generating unit 550 can generate the node decryption key corresponding to the node encryption key. Specifically, when any of the nodes ranging from the terminal node of the lower-level subtree 220 associated with the decrypting device 110 to the root node of the lower-level subtree 220 is the decryption enabled node, the lower-level node decryption key generating unit 550 can generate the node decryption key corresponding to the decryption enabled node.

The lower-level node decryption key generating unit 550 according to this embodiment can generate the node decryption key $L_{i,l}$ based on the device decryption key $I_{i,x}$ of the relevant decrypting device 110 indicated as ($U_{i,x}$), and on public keys $e_k$ corresponding to the respective decrypting devices 110 other than the relevant decrypting device 110, which correspond to the respective descendant terminal nodes of the decryption enabled node. To be more precise, the lower-level node decryption key generating unit 550 can generate the node decryption key $L_{i,l}$ having the identical value to the node encryption key as defined in the formula (2) based on a value obtained by raising the device decryption key of the decrypting device 110 by the product $\beta_{i,l}/e_x$ of the public keys $e_k$ of the respective decrypting devices 110 other than the relevant decrypting device 110, which correspond to the respective descendant terminal nodes of the decryption enabled node (formula (5)):

[Formula 5]

$$L_{i,\lambda} = I_{i,x}^{\beta_{i,\lambda}/e_x} \mod n_i \qquad (5)$$

This node decryption key $L_{i,l}$ may be based on the product of secret keys $d_{i,k}$ corresponding to the decrypting devices 110 which do not belong to the group of decrypting devices 110 enabled to decrypt the encrypted message among the plurality of decrypting devices 110 associated with the lower-level subtree 220.

The formula (5) utilizes the fact that $A^{e \cdot d} \equiv A(\mod n_i)$ can be satisfied between a public key e and an encryption key d in the RSA encryption system. Specifically, by finding the raised value by use of the product $\beta_{i,l}/e_x$ of the public keys of the device decryption key $I_{i,l}$, the product $T_i/d_{i,j}$ of the encryption keys of the decrypting devices 110 other than the relevant decrypting device 110 being a multiplier component of $A_i$ in the formula (1) can be multiplied by the product $\beta_{i,l}/e_j$ of the public keys of the decrypting devices 110 enabled for decryption, and the encryption key of the decrypting device 110 enabled for decryption can be subtracted from the multiplier. In this way, the lower-level node decryption key generating unit 550 can obtain the node decryption key which is identical to the node encryption key generated by the encrypting device 100.

Next, the message decrypting unit 560 may decrypt the encrypted message by use of the node decryption key which is either acquired by the higher-level node decryption key acquiring unit 530 or generated by the lower-level node decryption key generating unit 550 (S630). Specifically, the message decrypting unit 560 can search the decryption enabled node $s_l$, corresponding to the decrypting device 110 out of a broadcast message indicated in the following formula (6):

[Formula 6]

$$\langle [s_1, K, s_m, C_1, K, C_m], M \rangle \quad (6)$$

Next, the message decrypting unit 560 can decrypt the title key K in accordance with the following formula (7) while using a node decryption key $L_{sl}$ corresponding to the decryption enabled node $s_l$:

[Formula 7]

$$K = D_{L_{sl}}(C_\lambda) \quad (7)$$

Here, D( ) is a decrypting function corresponding to E( ).

Thereafter, the message decrypting unit 560 can decrypt the message in accordance with the following formula (8) while using the decrypted title key K:

[Formula 8]

$$M = G_K(M') \quad (8)$$

According to the above-described encrypted communication system 10, the secret key $d_{i,j}$ may be managed by the encrypting device 100 and may be kept secret from the decrypting devices 110. Moreover, each of the decrypting devices 110 can manage the device decryption key $I_{i,j}$ based on the secret keys $d_{i,j}$ for the decrypting devices 110 other than the relevant decrypting device among the decrypting devices 110 corresponding to the lower-level subtree 220 in secret from other decrypting devices 110. Accordingly, each of the decrypting devices 110 can generate the node decryption key $L_{i,l}$ by removing the secret key $d_{i,j}$ out of the multiplier constituting the device decryption key $I_{i,j}$ while using the public keys $e_j$ corresponding to other decrypting devices 110 enabled to decrypt the message.

Meanwhile, a decrypting device 110 with the decrypting of the message disabled may not possess the encryption key $d_{i,j}$ corresponding to the decrypting device 110. Accordingly, the decrypting device 110 cannot add the encryption key $d_{i,j}$ to the multiplier to constitute the device decryption key $I_{i,j}$ possessed by the decrypting device 110. Moreover, even if a plurality of decrypting devices 110 with the decrypting of the message disabled exchange device decryption keys, any of the decrypting devices 110 cannot add the encryption key $d_{i,j}$ of the decrypting device 110 with the decrypting of the message disabled to the multiplier to constitute the device decryption key $I_{i,j}$ possessed by the decrypting device 110. Therefore, the decrypting device 110 with the decrypting of the message disabled cannot generate the node decryption key corresponding to the decryption enabled node. In this way, confidentiality of the message can be retained.

Note that the encrypted communication system 10 according to this embodiment can manage lower layers of the tree 200 by use of the tree structure. Alternatively, the encrypted communication system 10 may manage the lower layers of the tree 200 by use of other methods. For example, the encrypted communication system 10 may dynamically select and group an arbitrary set of decrypting devices 110 enabled for decryption among a plurality of decrypting devices 110 corresponding to each lower-level subtree 220.

To be more precise, the node associating information generating unit 300 may function as a group associating information generating unit, and dynamically generate the group of the decrypting devices 110 enabled to decrypt the encrypted message in terms of each terminal node of the higher-level tree 210 out of the plurality of decrypting devices 110 associated with the terminal node. Then, group information for identifying the decrypting devices 110 belonging to the group may be outputted to the node extracting unit 310 and to the network 120. The node extracting unit 310 may extract the decryption enabled node in terms of the tree 200, and outputs the decryption enabled node to the higher-level node encryption key generating unit 320. Meanwhile, in terms of the lower layers, the node extracting unit 310 may output the group information to the lower-level node encryption key generating unit 330. The lower-level node encryption key generating unit 330 may function as an encryption key generating unit for the lower layers, and may calculate a group encryption key based on the product of the secret keys $d_{i,j}$ corresponding to the respective decrypting devices 110 not belonging to the group of decrypting devices 110 enabled to decrypt the encrypted message among the plurality of decrypting devices 110 as similar to calculation of the node encryption key. Thereafter, the message encrypting unit 340 may encrypt the message by use of either the node encryption key outputted from the higher-level node encryption key generating unit 320 or by use of the group encryption key generated by the lower-level node encryption key generating unit 330.

In this case, the node associating information acquiring unit 500 can function as a group information acquiring unit and can acquire the group information generated by the encrypting device 100. The lower-level node decryption key generating unit 550 can function as a group decryption key generating unit, and can generate a group decryption key $L_{i,j}$ for the encrypted message based on the product of the secret keys $d_{i,k}$ corresponding to the decrypting devices 110 which do not belong to the group of decrypting devices 110 enabled to decrypt the encrypted message, based on the public key $e_j$ corresponding to the respective decrypting devices 110 belonging to the group of decrypting devices 110 enabled to decrypt the encrypted message and on the device decryption key $I_{i,j}$ of the relevant decrypting device 110. Then, the message decrypting unit 560 can decrypt the encrypted message by use of the group decryption key $L_{i,j}$ in terms of the lower layers of the tree 200.

Figure 7:
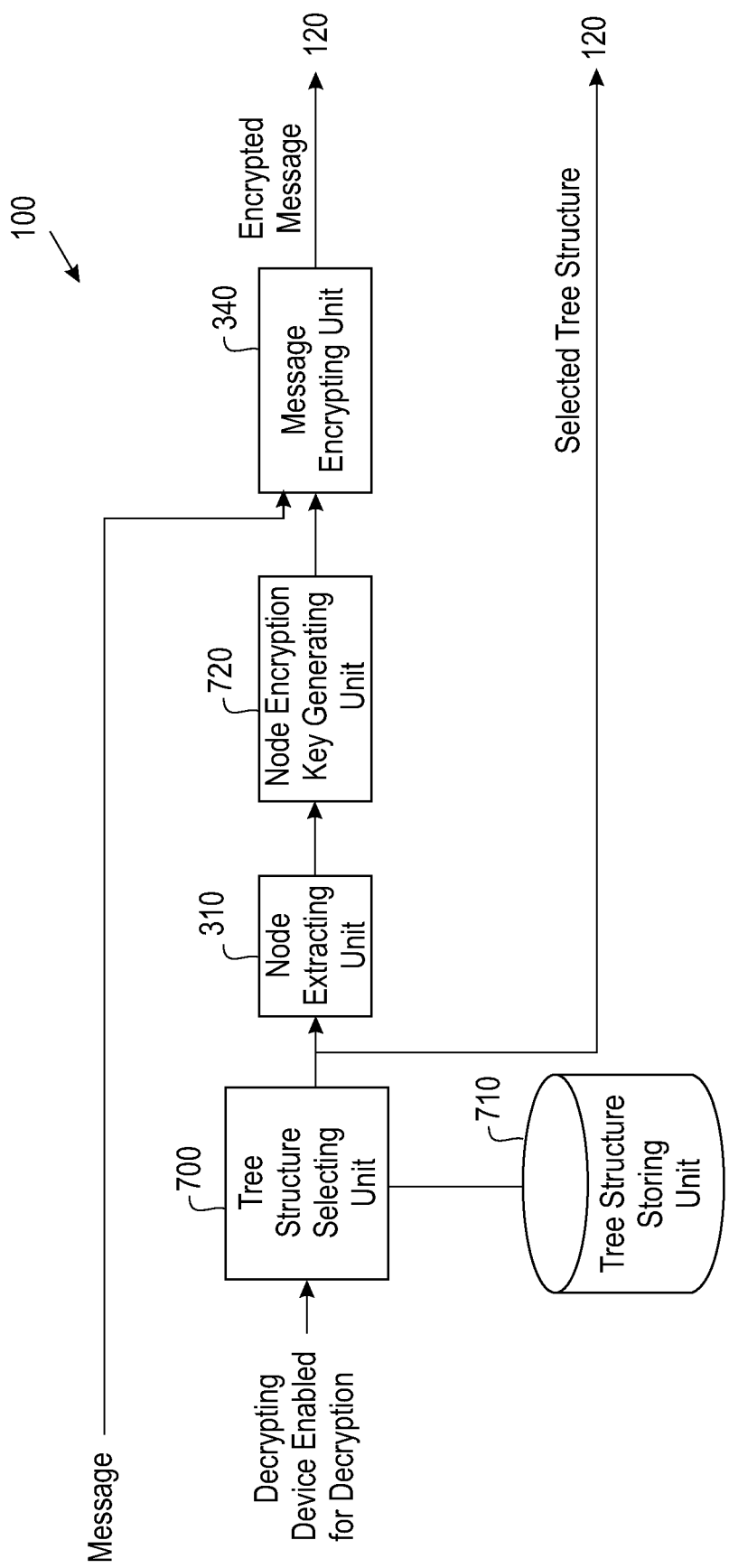
FIG. 7 is a view showing a configuration of the encrypting device 100 according to a modified example of the embodiment of the present invention.

FIG. 7 shows a configuration of the encrypting device 100 in the encrypted communication system 10 according to a modified example of this embodiment. The encrypted communication system 10 according to this modified example can reduce the message length by selecting a tree structure capable of minimizing the number of decryption enabled nodes out of a plurality of tree structures. The encrypting device 100 according to this modified example may include a tree structure storing unit 710, a tree structure selecting unit 700, the node extracting unit 310, a node encryption key generating unit 720, and the message encrypting unit 340. The tree structure storing unit 710 may store a plurality of tree structures. Here, the tree structure storing unit 710 can store the plurality of tree structures by respectively associating sets of decrypting devices 110 having more similarity of types or characteristics with descendant terminal nodes of a decryption enabled node closer to the terminal node, based on mutually different types of the decrypting devices 110 or on various characteristics of users of the decrypting devices 110. For example, the tree structure storing unit 710 may store multiple types of tree structures based on whether information processing devices functioning as the decrypting devices 110 are PCs, PDAs, cellular telephones, and the like, on manufacturers of the information processing devices functioning as the decrypting devices 110, and on characteristics of the users including ages, genders, addresses, preferences, membership of institutions, and the like.

The tree structure selecting unit 700 may select any of the tree structures based on the set of decrypting devices 110 enabled to decrypt the encrypted message, and can output tree structure selection information for specifying the selected tree structure to the node extracting unit 310 and to the network 120. The node extracting unit 310 can extract the set of decryption enabled nodes in terms of the selected tree structure as similar to the node extracting unit 310 illustrated in FIG. 3. The node encryption key generating unit 720 may generate the node encryption key corresponding to each of the decryption enabled nodes as similar to the higher-level node encryption key generating unit 320. The message encrypting unit 340 can encrypt the message by use of the respective node encryption keys associated with the respective decryption enabled nodes belonging to the set of selected decryption enabled nodes as similar to the message encrypting unit 340 illustrated in FIG. 3.

Figure 8:
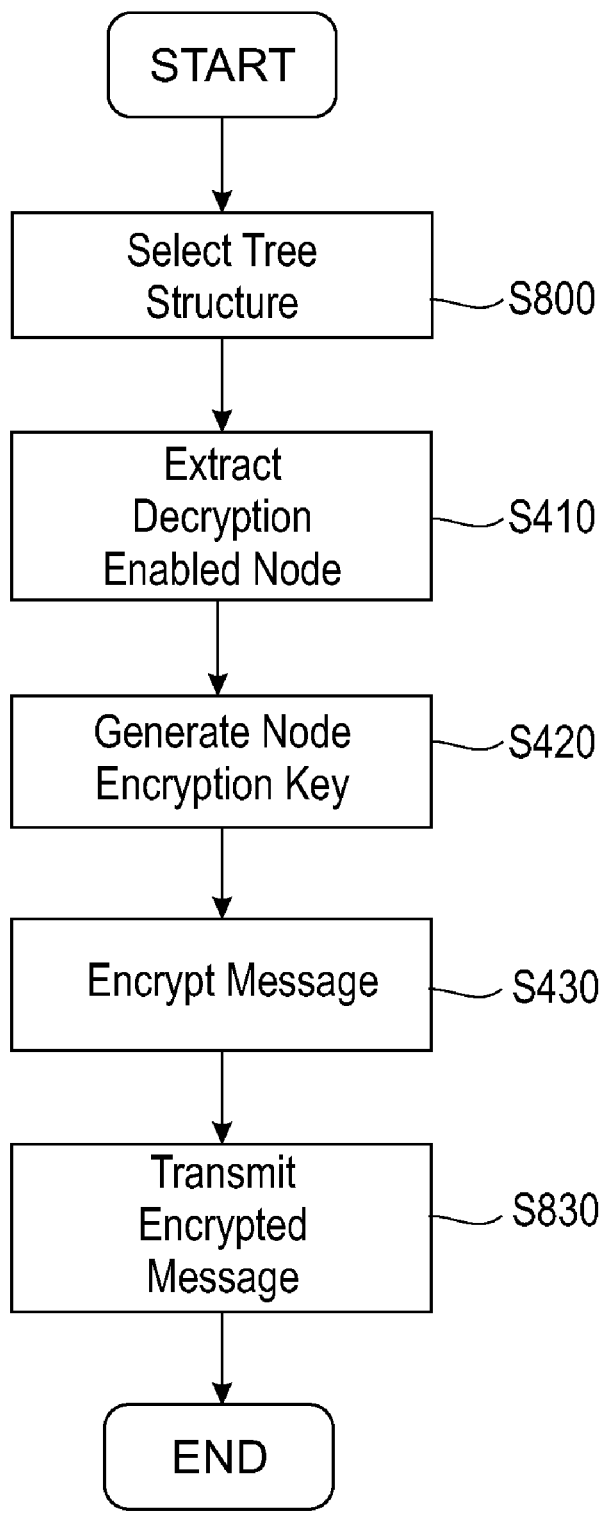
FIG. 8 is a view showing an operational flow of the encrypting device 100 according to the modified example of the embodiment of the present invention.

FIG. 8 shows an operational flow of the encrypting device 100 according to the modified example of this embodiment. Firstly, the tree structure selecting unit 700 may select any of the tree structures based on the set of decrypting devices 110 enabled to decrypt the encrypted message (S800). Here, the tree structure selecting unit 700 can select the set of nodes to minimize the number of decryption enabled nodes among the sets of decryption enabled nodes selected in terms of each tree structure. Alternatively, the tree structure selecting unit 700 may select any of the tree structures based on the type of decrypting devices 110 enabled to decrypt the encrypted message or on the characteristics of users. Specifically, the tree structure selecting unit 700 may select a predetermined tree structure based on the characteristics of the users, such as ages or genders, who are prospective audiences of a program of contents to be distributed, for example.

The node extracting unit 310 can extract the set of decryption enabled nodes which do not contain the decrypting device 110 with the decrypting of the encrypted message disabled in a descendant terminal node but contains the decrypting device 110 enabled to decrypt the encrypted message in a descendant terminal node of any of the nodes as similar to S410 in FIG. 4 (S410). Next, the node encryption key generating unit 720 may generate the node encryption key corresponding to each of the decryption enabled nodes belonging to the set of decryption enabled nodes as similar to S420 in FIG. 4 (S420). In this case, the node encryption key generating unit 720 may generate the node encryption key for each of the decryption enabled nodes by sequentially generating the node encryption keys starting from the node decryption key corresponding to the root node and in the order of the node encryption key for a parent node to the node encryption keys for child nodes while utilizing a one-way function with trapdoor as disclosed in Non-Patent Document 9.

Next, the message encrypting unit 340 can encrypt the message respectively by use of the node encryption keys associated with the respective decryption enabled nodes belonging to the selected set of decryption enabled nodes (S430). To be more precise, the message encrypting unit 340 can encrypt the message by use of the title key, then can encrypt the title key by use of each of the node encryption keys, and thereby can generate the broadcast message containing the encrypted messages indirectly encrypted by the respective node encryption keys. Thereafter, the broadcast message including the plurality of encrypted messages may be transmitted to the respective decrypting devices 110 (S830).

According to the encrypting device 100 of this modified example, it may be possible to reduce the number of node encryption keys used for encryption by dynamically selecting the tree structure in relation to the set of the decrypting devices 110 enabled to decrypt the encrypted message.

Figure 9:
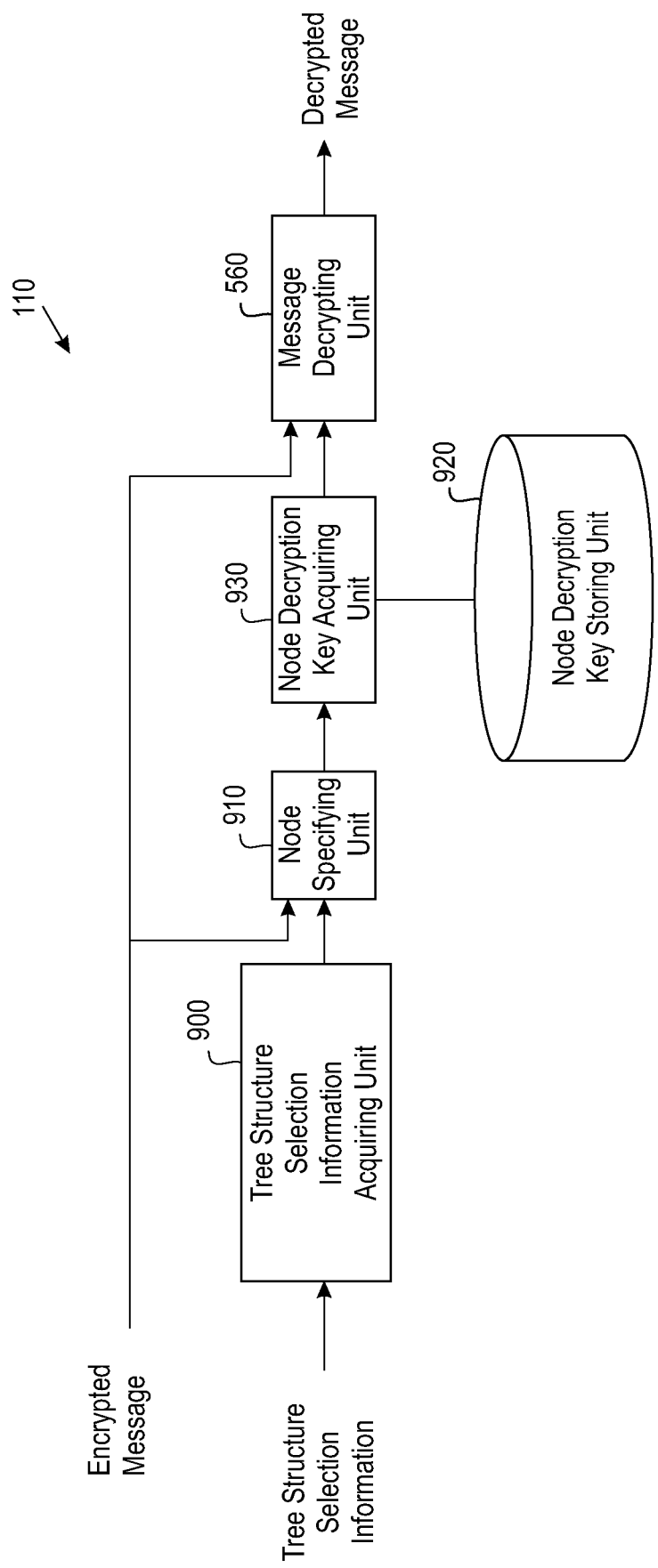
FIG. 9 is a view showing a configuration of the decrypting device 110 according to the modified example of the embodiment of the present invention.

FIG. 9 shows a configuration of the decrypting device 110 according to the modified example of this embodiment. The decrypting device 110 according to this modified example includes a tree structure selection information acquiring unit 900, a node specifying unit 910, a node decryption key storing unit 920, a node decryption key acquiring unit 930, and the message decrypting unit 560. The tree structure selection information acquiring unit 900 can acquire the tree structure selection information transmitted from the encrypting device 100. The node specifying unit 910 may specify the selected decryption enabled node out of the nodes located on the path ranging from the terminal node corresponding to the decrypting device 110 to the root node thereof in the tree structure as a pool for selecting the set of nodes. The node decryption key storing unit 920 can store the respective node decryption keys corresponding to the respective nodes on the path ranging from the terminal node corresponding to the decrypting device 110 to the root node thereof, in terms of each of the plurality of tree structures. The node decryption key acquiring unit 930 may acquire the node decryption key associated with the decryption enabled node specified by the node specifying unit 910 in the tree structure as the pool for selecting the set of the decryption enabled nodes from the node decryption key storing unit 920. The message decrypting unit 560 may decrypt the encrypted message encrypted by use of the node encryption key associated with the decryption enabled node specified by the node decryption key storing unit 920 while using the acquired node decryption key.

Figure 10:
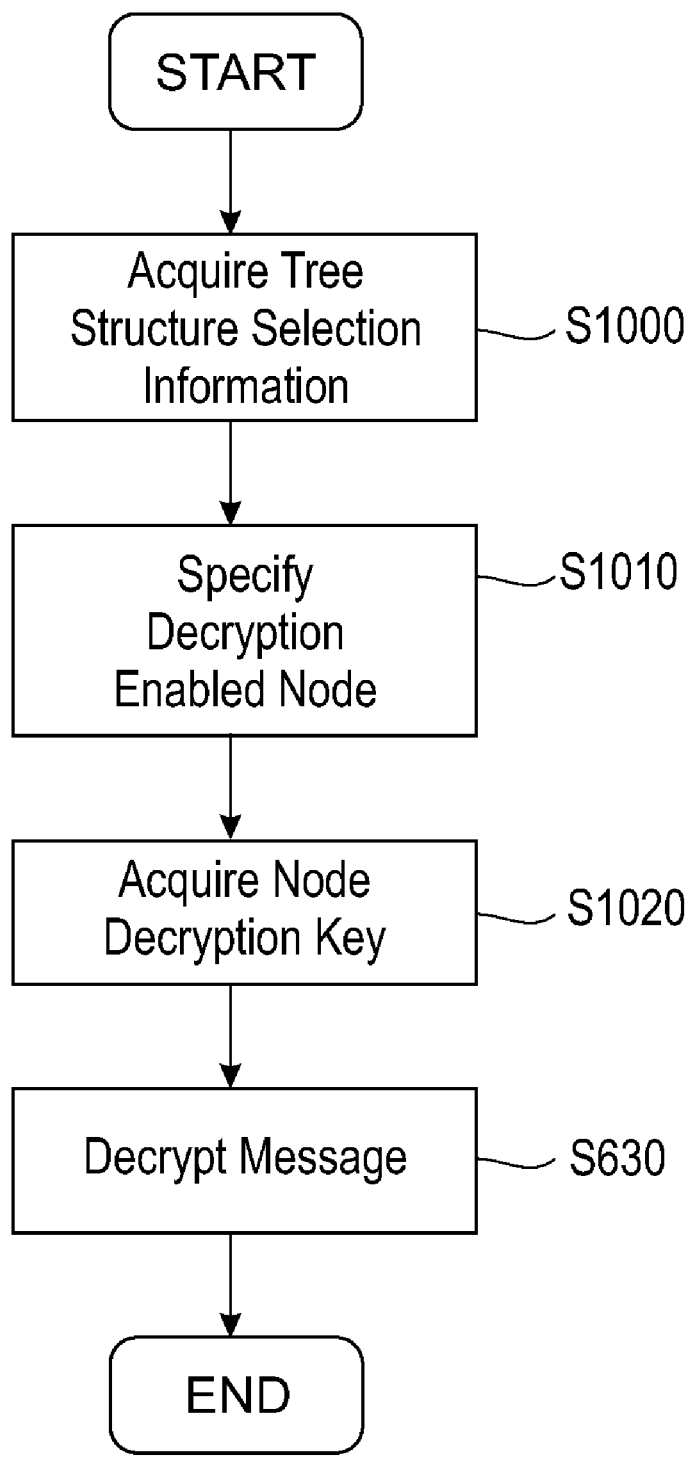
FIG. 10 is a view showing an operational flow of the decrypting device 110 according to the modified example of the embodiment of the present invention.

FIG. 10 shows an operational flow of the decrypting device 110 according to the modified example of this embodiment. Firstly, the tree structure selection information acquiring unit 900 can acquire the tree structure selection information transmitted from the encrypting device 100 (S1000). Next, the node specifying unit 910 can specify the decryption enabled node on the path ranging from the terminal node corresponding to the decrypting device 110 to the root node thereof in the selected tree structure (S1010). Next, the node decryption key acquiring unit 930 can acquire the node decryption key associated with the decryption enabled node in the selected tree structure from the node decryption key storing unit 920 (S1020). Alternatively, the decrypting device 110 may generate the node decryption key for each of the decryption enabled nodes by sequentially generating the node decryption keys starting from the terminal node corresponding to the decrypting device 110 and in the order of the node decryption keys for the child nodes to the node decryption keys for the parent node. Next, the message decrypting unit 560 can decrypt the encrypted message encrypted by the node encryption key associated with the decryption enabled node specified by the node specifying unit 910 while using the acquired node decryption key as similar to the message decrypting unit 560 illustrated in FIG. 5 (S630). To be more precise, the title key encrypted by the node encryption key may be decrypted by use of the node decryption key and then the message can be decrypted by use of the decrypted title key.

In the above-described configuration, the encrypted communication system 10 may designate the decrypting device 110 enabled for decryption depending on an AND condition, an OR condition, and the like to be applied to the plurality of tree structures. To be more precise, in the case of the AND condition, in the encrypting device 100, the tree structure selecting unit 700 may select the first tree structure and the second tree structure to be used as the AND condition, and the node extracting unit 310 may extract a set of the first decryption enabled node in the first tree structure and of the second decryption enabled node in the second tree structure. Here, as the set of the first and second decryption enabled nodes, the node extracting unit 310 can select the set of nodes which contains the decrypting device 110 enabled to decrypt the encrypted message in descendant terminal nodes in common but does not contain the decrypting device 110 with the decryption of the encrypted message disabled in the descendant terminal nodes of at least one of the decryption enabled nodes. Moreover, the node encryption key generating unit 720 may generate the node encryption keys corresponding to these decryption enabled nodes, and the message encrypting unit 340 can encrypt the message by use of the first node encryption key associated with the first decryption enabled node and the second node encryption key associated with the second decryption enabled node.

The tree structure selection information acquiring unit 900 in the decrypting device 110 receiving the encrypted messages can receive the tree structure selection information, and may specify the first and second tree structures. Next, the node specifying unit 910 specifies the first and second decryption enabled nodes. Next, the node decryption key storing unit 920 can acquire the first node decryption key associated with the first decryption enabled node and the second node decryption key associated with the second decryption enabled node. Thereafter, the message decrypting unit 560 can decrypt the encrypted messages by use of the first and second node decryption keys thus acquired.

On the contrary, in the case of the OR condition, in the encrypting device 100, the tree structure selecting unit 700 can select first and second tree structures to be used as the OR condition, and the node extracting unit 310 can extract a set of the first decryption enabled node in the first tree structure and of the second decryption enabled node in the second tree structure. Here, as the set of the first and second decryption enabled nodes, the node extracting unit 310 can select the set of nodes which contains the decrypting device 110 enabled to decrypt the encrypted message in any of the descendant terminal nodes but which does not contain the decrypting device 110 with the decryption of the encrypted message disabled in the descendant terminal nodes of the decryption enabled node. Moreover, the node encryption key generating unit 720 can generate the node encryption keys corresponding to these decryption enabled nodes, and the message encrypting unit 340 can generate the encrypted message encrypted by use of the first node encryption key associated with the first decryption enabled node and the encrypted message encrypted by use of the second node encryption key associated with the second decryption enabled node.

The tree structure selection information acquiring unit 900 in the decrypting device 110 receiving the encrypted messages may receive the tree structure selection information, and may specify the first and second tree structures. Next, the node specifying unit 910 may specify the first and second decryption enabled nodes. Next, the node decryption key storing unit 920 can acquire the first node decryption key associated with the first decryption enabled node and the second node decryption key associated with the second decryption enabled node. Thereafter, the message decrypting unit 560 can decrypt any of the encrypted messages by use of the first or second node decryption key thus acquired.

By rendering the decryption enabled nodes selectable depending on the AND condition, the OR condition, and the like, it may be possible to further reduce the message length.

Figure 11:
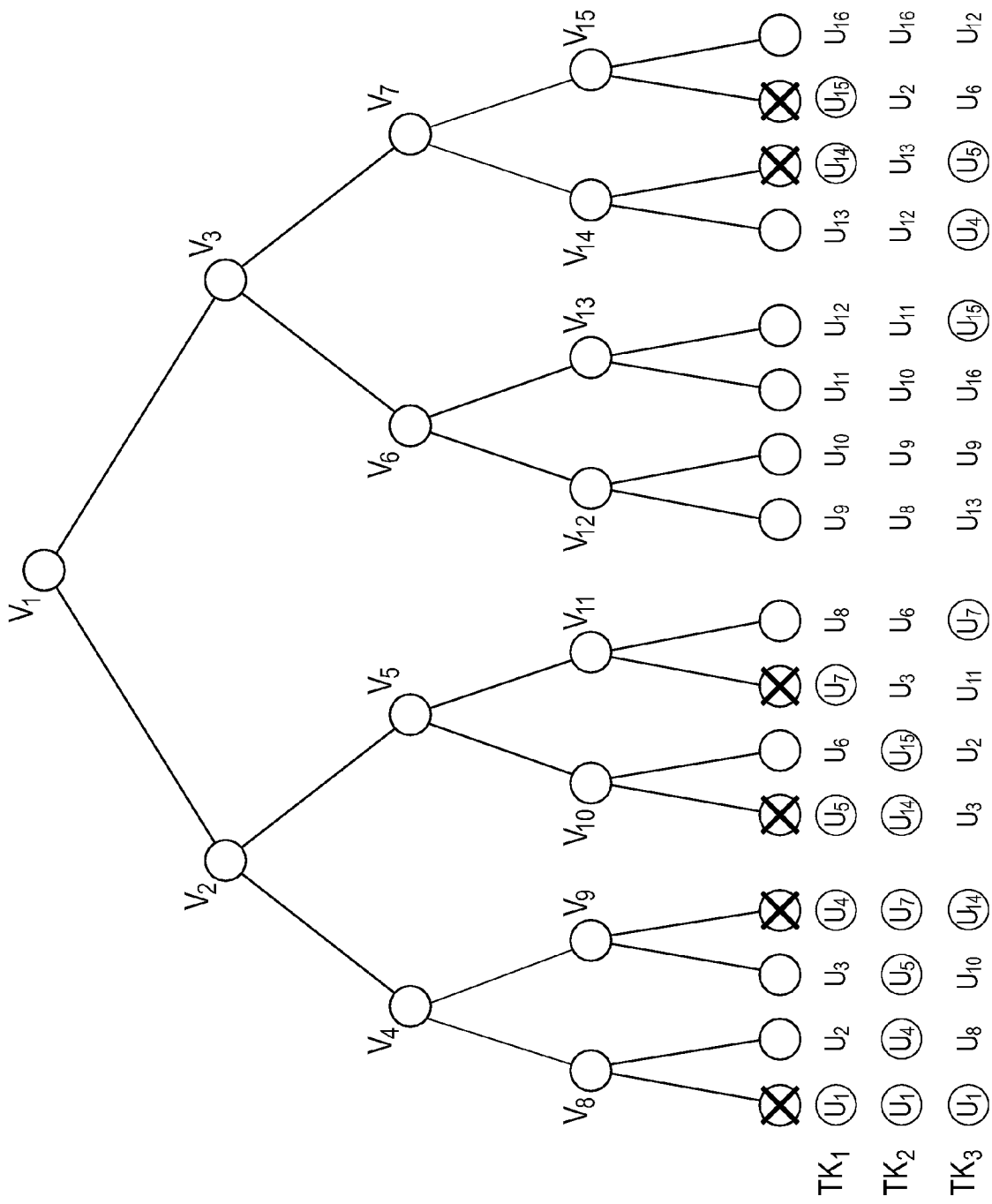
FIG. 11 is a view showing a tree structure for managing keys by the encrypted communication system 10 according to the modified example of the embodiment of the present invention.

FIG. 11 may show a tree structure for managing the keys by the encrypted communication system 10 according to the modified example of this embodiment. In the figure, the encrypted communication system 10 uses tree structures $TK_1$ to $TK_3$, which are determined based on mutually different types of the decrypting devices 110 or on various characteristics of the users of the decrypting devices 110. The tree structure selecting unit 700 in the encrypting device 100 selects any of the tree structures $TK_1$ to $TK_3$ based on the set of decrypting devices 110 enabled to decrypt the encrypted message. In this example, the set of decrypting devices 110 enabled to decrypt the encrypted message is defined as $\{u_2, u_3, u_6, u_8, u_9, u_{10}, u_{11}, u_{12}, u_{13}, u_{16}\}$, and the set of decrypting devices 110 with the decrypting of the encrypted message disabled may be defined as $\{u_1, u_4, u_5, u_7, u_{14}, u_{15}\}$. When the tree structures $TK_1$ to $TK_3$ are compared with one another in this example, it may be the tree structure $TK_2$ which minimizes the number of the decryption enabled nodes. Therefore, the tree structure selecting unit 700 can select the tree structure $TK_2$.

According to the encrypted communication system 10 of this modified example, each of the decrypting devices 110 can receive the encrypted message with the addition of the tree structure selection information for specifying the selected tree structure and can decrypt the encrypted message by use of the decryption key corresponding to the decryption enabled node in the selected tree structure. In this way, it may be possible to reduce the number of node keys used for decryption and thereby to shorten the message length. Moreover, by storing these tree structures in each of the decrypting devices 110 in advance, it may be possible to reduce the number of node keys without allowing the decrypting device 110 to acquire the node associating information having a larger data amount as compared to the tree structure selection information. For this reason, it may be possible to reduce the message length of the encrypted message efficiently in an environment where the encrypting device 100 and the decrypting device 110 cannot communicate with each other.

Figure 12:
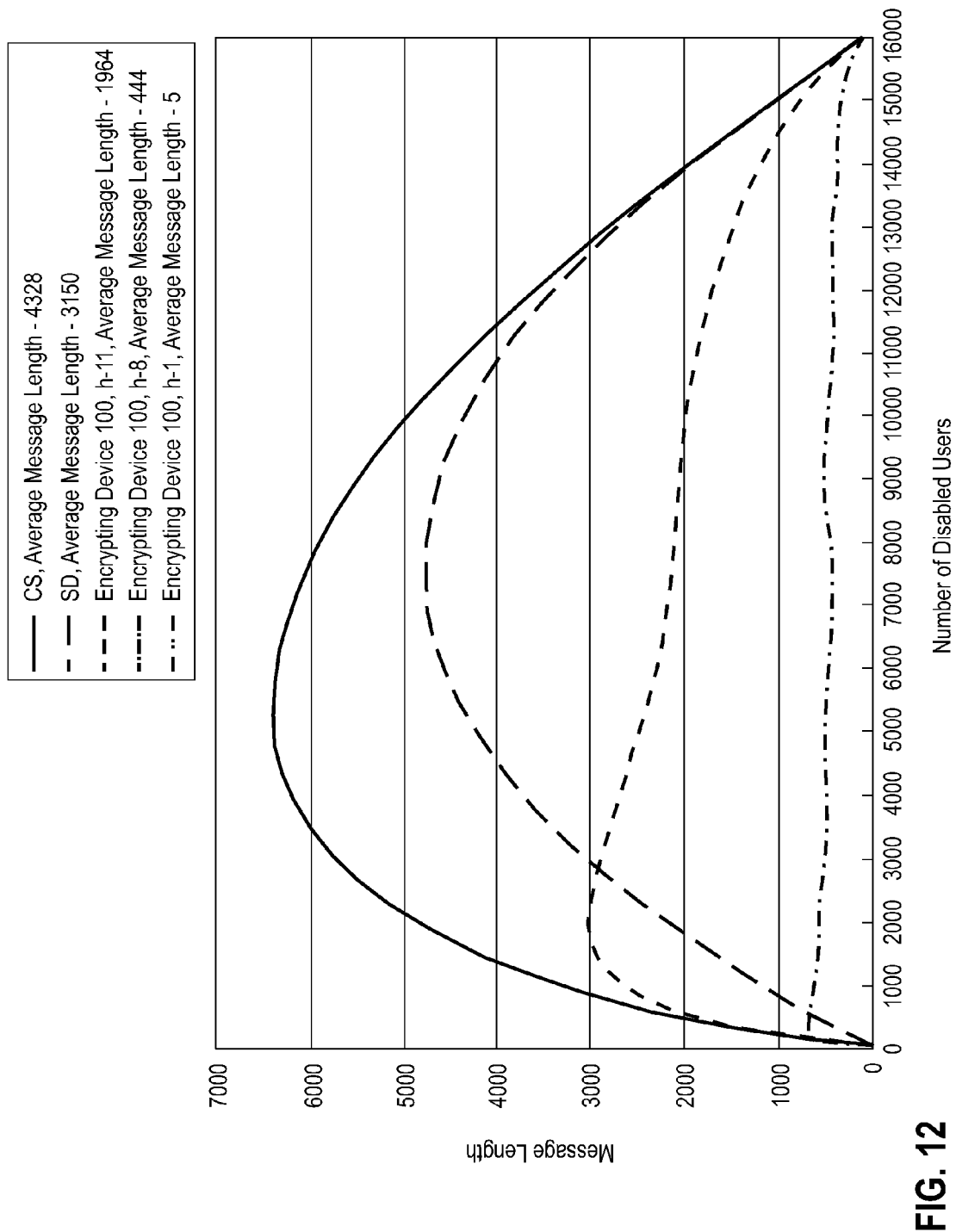
FIG. 12 is a graph of comparison between the encrypted communication system 10 according to the embodiment of the present invention and conventional methods.

FIG. 12 shows a graph of comparison between the encrypted communication system 10 according to this embodiment and conventional methods. This graph may be plotted by taking message lengths in the CS method and the SD method in the case of $N=2^{14}$ and message lengths in the case of changing the number of layers h of the higher-level tree 210 among 1, 8, and 11 as the longitudinal axis, while taking the number r of decrypting devices 110 with decryption disabled as the lateral axis. Here, the message length in each of the methods may represent an average value when selecting decryption devices 110 with decryption disabled at random. It may be apparent that the encrypted communication system 10 according to this embodiment can reduce the message length even when h is equal to 11, and that the encrypted communication system 10 can reduce the message length efficiently in particular when the number of r is increased to about half of the total number.

Meanwhile, the number of the keys each of the decrypting devices 110 is suppose to store may be equal to log N+1 in the CS method and $((\log N)^2 + \log N)/2+1$ in the SD method. On the contrary, the number of keys may be equal to h+1 ($1 \leq h \leq \log N-1$) according to the encrypted communication system 10 of this embodiment. Moreover, when reducing the number of the keys by calculating keys in each of the decrypting devices 110, the number of keys may be equal to 1 in the CS method and log N in the SD method. On the contrary, the number of keys may be equal to 1 according to the encrypted communication system 10 of this embodiment. Therefore, the encrypted communication system 10 according to this embodiment can reduce the message length significantly while suppressing the number of keys to be stored by the decrypting device 110 as small as the CS method and smaller than the SD method.

Figure 13:
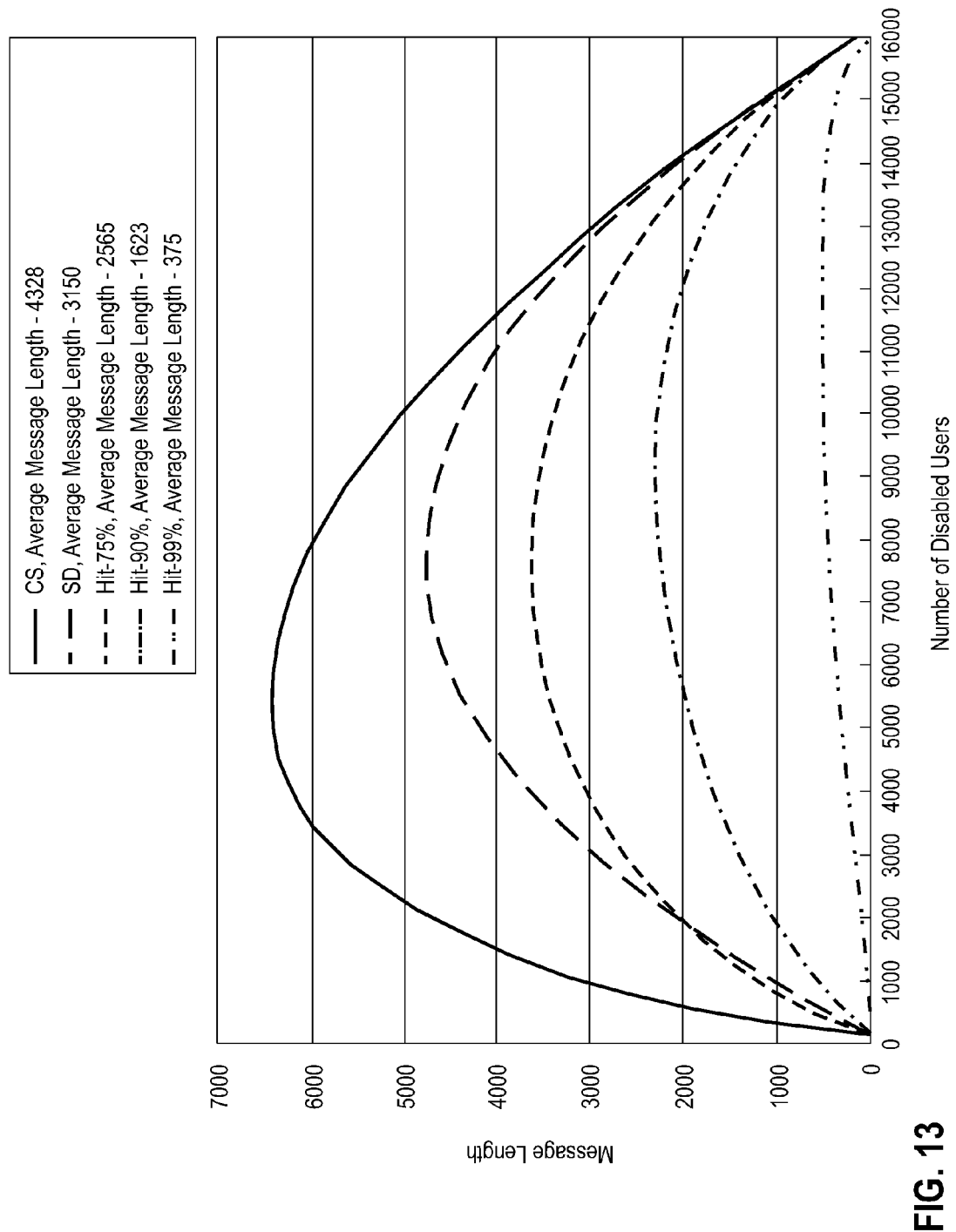
FIG. 13 is a graph of comparison between the encrypted communication system 10 according to the modified example of the embodiment of the present invention and the conventional methods.

FIG. 13 shows a graph of comparison between the encrypted communication system 10 according to the modified example of this embodiment and the conventional methods. This graph may be plotted by taking the message lengths in the CS method and the SD method in the case of N=2" and the message lengths by the encrypted communication system 10 according to the modified example of this embodiment as the longitudinal axis, while taking the number r of decrypting devices 110 with decryption disabled as the lateral axis. Here, concerning the encrypted communication system 10 according to this modified example, the message length can be obtained depending on a hit rate indicating the percentage of decrypting devices 110 with decryption disabled included in the selected tree structure. Meanwhile, the message length in each of the methods can represent the average value when selecting decryption devices 110 disabled for decryption at random. According to encrypted communication system 10 of this modified example, it may be possible to reduce the message length to about half as compared to the SD method even when the hit rate is equal to 90%.

Meanwhile, the number of keys each of the decrypting devices 110 is supposed to store may be equal to log N+1 in the CS method and $((\log N)^2+\log N)/2+1$ in the SD method. On the contrary, the number of keys may be equal to T*log N according to the encrypted communication system 10 of this embodiment (provided that T may be the number of selectable tree structures). Moreover, when it is made possible to calculate the keys in each of the decrypting devices 110 by use of a one-way function with trapdoor, the number of keys may be equal to 1 in the CS method and may be equal to T according to the encrypted communication system 10 of this modified example. Therefore, the encrypted communication system 10 according to this modified example can reduce the message length significantly by increasing the number of keys to be stored by the decrypting device 110 to some extent as compared to the CS method while applying an appropriate T factor.

Figure 14:
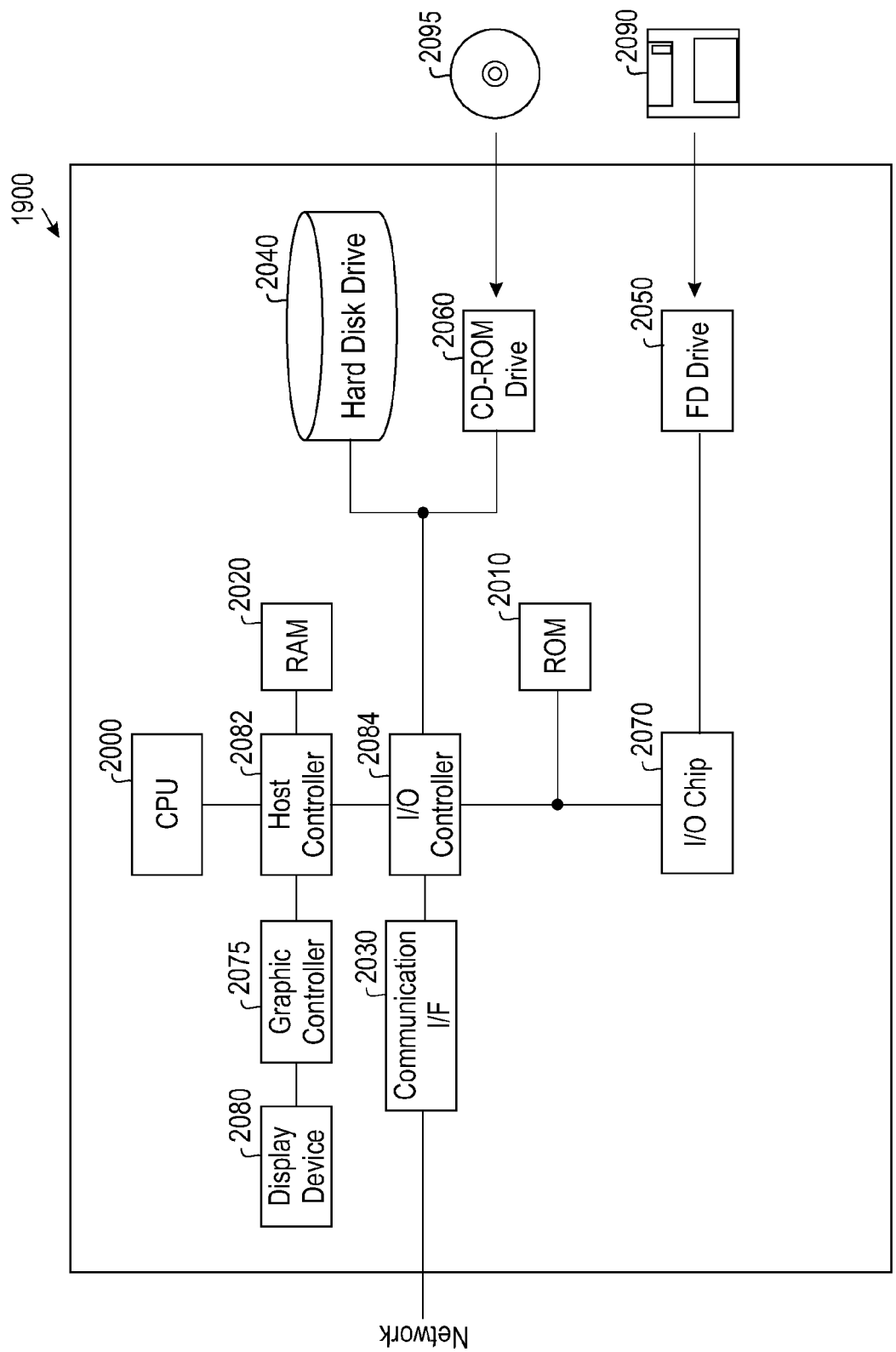
FIG. 14 is a view showing an example of a hardware configuration of a computer 1900 according to the embodiment of the present invention.

FIG. 14 shows an example of a hardware configuration of a computer 1900 according to this embodiment. The computer 1900 according to this embodiment may include: a CPU peripheral unit having a CPU 2000, a RAM 2020 and a graphic controller 2075 which are connected to one another by a host controller 2082, and a display device 2080; an input/output unit having a communication interface 2030, a hard disk drive 2040, and a CD-ROM drive 2060 which may be connected to the host controller 2082 by an input/output controller 2084; and a legacy input/output unit having a ROM 2010, a flexible disk drive 2050, and an input/output chip 2070 which may be connected to the input/output controller 2084.

The host controller 2082 may connect the RAM 2020, the CPU 2000 configured to access the RAM 2020 at a high transfer rate, and the graphic controller 2075 to one another. The CPU 2000 may operate based on programs stored in the ROM 2010 and the RAM 2020 to control the respective units. The graphic controller 2075 may acquire image data generated by the CPU 2000 and the like on a frame buffer provided in the RAM 2020, and may display the image data on the display device 2080. Alternatively, the graphic controller 2075 may incorporate the frame buffer for storing the image data generated by the CPU 2000 and the like.

The input/output controller 2084 can connect the host controller 2082, the communication interface 2030 which is a relatively high-speed input/output device, the hard disk drive 2040, and the CD-ROM drive 2060 to one another. The communication interface 2030 can communicate with other devices though a network. The hard disk drive 2040 can store the programs and data to be used by the CPU 2000 in the computer 1900. The CD-ROM drive 2060 can read a program or data out of a CD-ROM 2095 and can provide the program or the data to the hard disk drive 2040 through the RAM 2020.

Meanwhile, relatively low-speed input/output devices including the ROM 2010, the flexible disk drive 2050, and the input/output chip 2070 may be connected to the input/output controller 2084. The ROM 2010 can store a boot program to be executed by the computer 1900 at startup, a program depending on the hardware of the computer 1900, and the like. The flexible disk drive 2050 can read a program or data out of a flexible disk 2090 and can provide the program or the data to the hard disk drive 2040 through the RAM 2020. The input/output chip 2070 can connect various input/output devices through the flexible disk drive 2050, a parallel port, a serial port, a keyboard port, and a mouse port, for example.

The program to be provided to the hard disk drive 2040 through the RAM 2020 by the user may be stored in a recording medium such as the flexible disk 2090, the CD-ROM 2095, or an IC card. The program may be read out of the recording medium and installed in the hard disk drive 2040 in the computer 1900 through the RAM 2020, and is executed by the CPU 2000.

The program, which may be installed in the computer 1900 and configured to cause the computer 1900 to function as the encrypting device 100 illustrated in FIG. 3, may include a node associating information generating module, a node extracting module, a higher-level node encryption key generating module, a lower-level node encryption key generating module, a message encrypting module, a public key calculating module, and a publicizing module. The program or each of the modules may direct the CPU 2000 and the like to cause the computer 1900 to function as the node associating information generating unit 300, the node extracting unit 310, the higher-level node encryption key generating unit 320, the lower-level node encryption key generating unit 330, the message encrypting unit 340, the public key calculating unit 350, and the publicizing unit 360, respectively.

The program, which may be installed in the computer 1900 and configured to cause the computer 1900 to function as the decrypting device 110 illustrated in FIG. 5, may include a node associating information acquiring module, a terminal node specifying module, a higher-level node decryption key managing module for managing the higher-level node decryption key storing unit 520, the higher-level node decryption key acquiring module, a device decryption key managing module for managing the low-node decryption key generating unit 550, a lower-level node decryption key generating module, and a message decrypting module. The program or each of the modules can direct the CPU 2000 and the like to cause the computer 1900 to function as the node associating information acquiring unit 500, the terminal node specifying unit 510, the higher-level node decryption key storing unit 520, the higher-level node decryption key acquiring unit 530, the device decryption key storing unit 540, the lower-level node decryption key generating unit 550, and the message decrypting unit 560, respectively.

The program, which may be installed in the computer 1900 and configured to cause the computer 1900 to function as the encrypting device 100 illustrated in FIG. 7, can include a tree structure selecting module, a tree structure managing module for managing the tree structure storing unit 710, a node extracting module, a node encryption key generating module, and a message encrypting module. The program or each of the modules can direct the CPU 2000 and the like to cause the computer 1900 to function as the tree structure selecting unit 700, the tree structure storing unit 710, the node extracting unit 310, the node encryption key generating unit 720, and the message encrypting unit 340, respectively.

The program, which may be installed in the computer 1900 and configured to cause the computer 1900 to function as the decrypting device 110 illustrated in FIG. 9, can include a tree structure selection information acquiring module, a node specifying module, a node decryption key managing module for managing the node decryption key storing unit 920, a node decryption key acquiring module, and a message decrypting module. The program or each of the modules directs the CPU 2000 and the like to cause the computer 1900 to function as the tree structure selection information acquiring unit 900, the node specifying unit 910, the node decryption key storing unit 920, the node decryption key acquiring unit 930, and the message decrypting unit 560, respectively.

The programs or modules described above may be stored in an external storage medium as like program products. In addition to the flexible disk 2090 and the CD-ROM 2095, it may be possible to use an optical recording medium such as a DVD or a CD, a magneto-optical recording medium such as an MO, a tape medium, and a semiconductor memory such as an IC card, and the like, as the storage medium. Alternatively, it may be possible to use a storage device such as a hard disk or a RAM installed in a server system connected to an exclusive communication network or the Internet as the recording medium, and thereby to provide the program to the computer 1900 through the network.

Although the present invention has been described by use of the advantageous embodiment, it is to be noted that the technical scope of the present invention shall not be limited by the above-described embodiments. It is obvious to those skilled in the art that various modifications and improvements are applicable to the above-described embodiment. It is apparent from the appended claims that such modified or improved aspects can be also encompassed by the technical scope of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A system including an encrypting device and a decrypting device, comprising:
    a node associating information generating unit for generating node associating information for associating each of a plurality of first terminal nodes in a first tree structure;
    a plurality of second terminal nodes in a second tree structure connecting a plurality of nodes with each of a plurality of decrypting devices,
    wherein the decrypting devices correspond to respective descendant first terminal nodes of a first decryption enabled node and on the device decryption key of a specified decrypting device,
        on condition that any nodes ranging from
            a first terminal node associated with the specified decrypting device to
            a root node of the first tree structure,
            the second tree structure among a plurality of first nodes in the first tree structure, and
            the plurality of the second terminal nodes on the second tree structure connecting a plurality of nodes,
        is the first decryption enabled node,
        wherein said decrypting devices enabled to decrypt the encrypted message are associated with a descendent first terminal node in the first tree structure and the second tree structure;
    a node extracting unit for extracting the first decryption enabled node from the first tree structure and a second decryption enabled node from the second tree structure, in which said decryption devices are enabled to decrypt the encrypted message;
    a message encrypting unit for encrypting the message by use of a first node encryption key associated with the first decryption enabled node, wherein a public key and a secret key are predefined in relation to each of the decrypting devices, and the message encrypting unit further generates the first node encryption key based on the product of the secret keys, said secret keys corresponding to the respective decrypting devices, and said secret keys not being associated with the respective descendant first terminal nodes of the first decryption enabled node.

2. The system according to claim 1, wherein each of the decrypting devices is configured to store a device encryption key determined based on the product of the secret keys, said secret keys corresponding to the decrypting devices, other than the specified decrypting device, each of the decrypting devices is configured to generate a first node decryption key based on:

the product of the secret keys, said secret keys corresponding to the decrypting devices not belonging to a group of decrypting devices enabled to decrypt the encrypted message, the product of the public keys, the public keys corresponding to the respective decrypting devices, other than the specified decrypting device, and the public keys corresponding to the respective descendant first terminal nodes of the first decryption enabled node and further based on a device decryption key of the specified decrypting device when any of nodes ranging from the first terminal node associated with the specified decrypting device to the root node of the first tree structure is the first decryption enabled node, and the encrypting device further comprises:

a public key calculating unit for calculating the product of the public keys, the public keys corresponding to the respective decrypting devices, other than the specified decrypting device, and the public keys corresponding to the respective descendant first terminal nodes of the first decryption enabled node; and a publicizing unit for publicizing the product of the public keys to the plurality of decrypting devices.

3. The system according to claim 1, wherein the node extracting unit extracts a set of said first decryption enabled nodes out of the sets of first decryption enabled nodes in which all the decrypting devices are associated with the descendant first terminal nodes, the node associating information generating unit generates the node associating information to minimize the number of the first decryption enabled nodes to be extracted by the node extracting unit, and the message encrypting unit outputs a plurality of said encrypted messages by encrypting the message while using the respective first node encryption keys, with the first node encryption keys corresponding to the respective first decryption enabled nodes belonging to the extracted set of first decryption enabled nodes.

4. The system according to claim 3, wherein, in the case of outputting a first encrypted message and subsequently outputting a second encrypted message having a set of said decrypting devices enabled to decrypt encrypted messages different from the set in the first encrypted message, the node associating information generating unit generates the node associating information associating the decrypting device enabled to decrypt the first encrypted message and enabled to decrypt the second encrypted message.

5. The system according to claim 4, wherein, in the case of outputting a first encrypted message and subsequently outputting a second encrypted message having a set of said decrypting devices enabled to decrypt encrypted messages different from the set in the first encrypted message, the node extracting unit further extracts the first decryption enabled node in which the decrypting devices enabled to decrypt the second encrypted message are associated with the descendant first terminal nodes and the decrypting device with the decrypting of the second encrypted message disabled is not associated with any of the descendant first terminal nodes, and the node associating information generating unit further generates the node associating information to minimize the number of said first decryption enabled nodes to be extracted by the node extracting unit in relation to the second encrypted message.

6. The system according to claim 1, said decrypting device comprising:

a node associating information acquiring unit, wherein said decrypting device being a specified device from a group of decrypting devices enabled to decrypt the encrypted message, said node associating information acquiring unit acquires node associating information generated in relation to the group of decrypting devices, a terminal node specifying unit for specifying the first terminal node, which is associated with the specified decrypting device, based on the node associating information; and a message decrypting unit for decrypting the encrypted message by use of a first node decryption key, the first node decryption key corresponding to the first decryption enabled node on condition that any nodes ranging from the first terminal node associated with the specified decrypting device to the root node of the first tree structure is the first decryption enabled node.

7. The system according to claim 6, wherein a public key and a secret key are predefined in relation to each of the decrypting devices, the encrypting device is configured to encrypt the message by use of the first node encryption key based on a product of the secret keys, with the secret keys corresponding to the respective decrypting devices not associated with the respective descendant first terminal nodes of the first decryption enabled node among the plurality of decrypting devices, and each decrypting device further comprising:

a device decryption key storing unit for storing a device decryption key determined based on the product of the secret keys of the decrypting devices other than the specified decrypting device among the plurality of decrypting devices; and a node decryption key generating unit for generating the first node decryption key based on the product of the secret keys, with the secret keys corresponding to the decrypting devices not belonging to the group of said decrypting devices enabled to decrypt the encrypted message, and the generation of the first node decryption key is based on
the public keys, with the public keys corresponding to the respective decrypting devices other than the specified decrypting device, and the public keys corresponding to the respective descendant first terminal nodes of the first decryption enabled node
and based on the device decryption key of the specified decrypting device,
on condition that any of the nodes ranging from the first terminal node associated with the specified decrypting device to the root node of the first tree structure is the first decryption enabled node.

8. The system according to claim 7,
wherein the public key and the secret key corresponding to each of the decrypting devices is a set of a public key and a secret key in the Rivest-Shamir-Adleman encryption system,
the encrypting device is configured to encrypt the message by use of the node encryption key based on a value obtained by raising a predetermined number by the product of the secret keys, with the secret keys corresponding to the respective decrypting devices associated with the descendant first terminal nodes of the first decryption enabled node,
the device decryption key storing unit stores the device decryption key determined based on a value obtained by raising the predetermined value by the product of the secret keys, with the secret keys corresponding to the decrypting devices other than the specified decrypting device, and
the node decryption key generating unit generates the node decryption key having the identical value to the first node encryption key based on a value obtained by raising the device decryption key of the specified decrypting device by the product of the public keys of the respective decrypting devices, other than the specified decrypting device, with the public keys corresponding to the respective descendant first terminal nodes of the first decryption enabled node.

9. The system according to claim 6,
wherein the encrypting device is configured to store the second tree structure connecting respective root nodes of a plurality of said first tree structures as a plurality of second terminal nodes,
on condition that said decrypting devices corresponding to all the first terminal nodes connected to at least one of the first tree structures are enabled to decrypt the encrypted message,
the encrypting device is configured to extract a second decryption enabled node, in which the root node of the specified first tree structure is connected as a descendant second terminal node and in which the root node of the first tree structure having the decrypting device disabled to decrypt the encrypted message associated with the first terminal node thereof is not connected as the descendant second terminal node, and
the encrypting device is configured to encrypt the message by use of any of the first node encryption key associated with the first decryption enabled node and a second node encryption key associated with the second decryption enabled node, and
in the case where the encrypted message is encrypted by use of the second node encryption key,
the message decrypting unit decrypts the encrypted message by use of a second node decryption key corresponding to the second decryption enabled node
on condition that any of nodes ranging from the second terminal node corresponding to the root node of the first tree structure where the specified decrypting device is associated with the first terminal node to the root node of the second tree structure is the second decryption enabled node.

10. A system including an encrypting device for encrypting a message and a decrypting device for decrypting the message,
the encrypting device corresponding to respective descendant first terminal nodes of a first decryption enabled node and on the device decryption key of a specified decrypting device among a plurality of decrypting devices,
on condition that any nodes ranging from
a first terminal node associated with the specified decrypting device, to
a root node of the first tree structure,
a second tree structure among a plurality of first nodes in the first tree structure, and
a plurality of second terminal nodes on the second tree structure connecting a plurality of nodes,
is the first decryption enabled node
wherein said specified decrypting device enabled to decrypt the encrypted message is associated with a descendent first terminal node in the first tree structure and the second tree structure, comprises a message encrypting unit,
wherein said message encrypting unit encrypts the message to be encrypted by use of a group encryption key,
wherein a public key and a secret key are predefined in relation to each of the plurality of decrypting devices,
each decrypting device comprising:
a device decryption key storing unit for storing a device decryption key, the decryption key being determined based on the product of the secret keys of some of the decrypting devices among the plurality of decrypting devices, said product not including the specified decrypting device.

11. The system of claim 10 further comprising,
a group decryption key generating unit for generating a group decryption key for the encrypted message based on the product of the secret keys, the secret keys corresponding to the decrypting devices not belonging to a group of said decrypting devices enabled to decrypt the encrypted message,
the group decryption key being generated based on the public keys, the public keys corresponding to the respective decrypting devices belonging to the group of said decrypting devices and on the device decryption key of the specified decrypting device; and
a message decrypting unit for decrypting the encrypted message by use of the group decryption key.

12. A cryptographic method for encrypting a message with an encrypting device and decrypting the message with a decrypting device comprising:
generating node associating information for associating each of a plurality of first terminal nodes in a first tree structure and a plurality of second terminal nodes in a second tree structure connecting a plurality of nodes with each of a plurality of decrypting devices, the decrypting devices corresponding to respective descendant first terminal nodes of a first decryption enabled node and on the device decryption key of a specified decrypting device, on condition that any nodes
ranging from a first terminal node associated with the specified decrypting device, to
a root node of the first tree structure,
the second tree structure among a plurality of first nodes in the first tree structure, and
a plurality of second terminal nodes on the second tree structure connecting a plurality of nodes,
is the first decryption enabled node,
wherein said specified decrypting device enabled to decrypt the encrypted message is associated with a descendent first terminal node in the first tree structure and the second tree structure, in relation to a group of said decrypting devices enabled to decrypt the encrypted message; and
a message encrypting step of encrypting the message by use of a first node encryption key;
wherein a public key and a secret key are predefined in relation to each of the decrypting devices, and
generating the first node encryption key based on a product of the secret keys,
said secret keys corresponding to the said decrypting devices, and
said secret keys not being associated with respective descendant first terminal nodes of the first decryption enabled node.

13. The method of claim 12, further comprising:
a node associating information acquiring step of acquiring the node associating information generated in relation to the group of decrypting devices enabled to decrypt the encrypted message;
a terminal node specifying step of specifying the first terminal node, which is associated with the specified decrypting device, based on the node associating information; and
a message decrypting step of decrypting the encrypted message by use of a first node decryption key corresponding to the first decryption enabled node on condition that any nodes ranging from the first terminal node associated with the specified decrypting device to the root node of the first tree structure is the first decryption enabled node.

14. A cryptographic method for encrypting a message with an encrypting device and decrypting the message with a decrypting device,
wherein a public key and a secret key are predefined in relation to each of a plurality of decrypting devices, with the public key and secret key corresponding to respective descendant first terminal nodes of a first decryption enabled node,
on condition that any nodes including:
ranging from a first terminal node associated with the specified decrypting device, to
a root node of a first tree structure,
a second tree structure among a plurality of first nodes in the first tree structure, and
a plurality of second terminal nodes on the second tree structure connecting a plurality of nodes,
is the first decryption enabled node,
wherein said specified decrypting device enabled to decrypt the encrypted message is associated with a descendent first terminal node in the first tree structure and the second tree structure, for decrypting the encrypted message,
the encrypting method comprising a message encrypting step of encrypting the message by use of a group encryption key; and a device decryption key storing step of storing a device decryption key determined based on the product of the secret keys of the decrypting devices other than the specified decrypting device among the plurality of decrypting devices.

15. The method of claim 14, further comprising:
a group decryption key generating step of generating a group decryption key for the encrypted message based on the product of the secret keys, with the secret keys corresponding to the decrypting devices not belonging to the group of said decrypting devices enabled to decrypt the encrypted message,
the group decryption key being generated based on the public keys corresponding to decrypting devices belonging to a group of said decrypting devices enabled to decrypt the encrypted message and on the device decryption key of the specified decrypting device; and
a message decrypting step of decrypting the encrypted message by use of the group decryption key.

16. A cryptographic method for encrypting a message with an encrypting device and decrypting the message with a decrypting device, comprising:
a tree structure storing step of storing a plurality of types of tree structures configured to apply each of a plurality of decrypting devices, with the decrypting devices corresponding to respective descendant first terminal nodes of a first decryption enabled node and the decrypting devices corresponding to a device decryption key of a specified decrypting device,
on condition that any of the nodes ranging from a first terminal node associated with the specified decrypting device to a root node of a first tree structure, and a second tree structure among a plurality of first nodes in the first tree structure, and a plurality of second terminal nodes on the second tree structure connecting a plurality of nodes, is the first decryption enabled node,
wherein said specified decrypting device enabled to decrypt the encrypted message is associated with a descendent first terminal node in the first tree structure and the second tree structure, as a terminal node and to connect the plurality of nodes;
a tree structure selecting step of selecting a plurality of the configured types of tree structures based on a set of said decrypting devices enabled to decrypt the encrypted message;
a node extracting step of extracting a set of decryption enabled nodes; and
a message encrypting step of outputting a plurality of said encrypted messages by encrypting the message; and
generating a node encryption key based on the product of secret keys corresponding to decrypting devices not associated with a descendant first terminal node.

17. A computer program product comprising a non-transitory computer usable medium having computer readable program code embodied therein for causing encryption of a message, the computer readable program code in said computer program product comprising computer readable program code for causing a computer to effect the functions of claim 1.

18. A computer program product comprising a non-transitory computer usable medium having computer readable program code embodied therein for causing encryption of a message, the computer readable program code in said computer program product comprising computer readable program code for causing a computer to effect the functions of claim 10.

19. A non-transitory program storage device readable by machine, tangibly embodying a program of instructions executable by the machine to perform method steps for encrypting a message, said method steps comprising the steps of claim 12.

20. A non-transitory program storage device readable by machine, tangibly embodying a program of instructions executable by the machine to perform method steps for encrypting a message, said method steps comprising the steps of claim 14.

21. A non-transitory program storage device readable by machine, tangibly embodying a program of instructions executable by the machine to perform method steps for encrypting a message, said method steps comprising the steps of claim 16.

22. A computer program product comprising a non-transitory computer usable medium having computer readable program code embodied therein for causing decryption of a message, the computer readable program code in said computer program product comprising computer readable program code for causing a computer to effect the functions of claim 6.

23. A computer program product comprising a non-transitory computer usable medium having computer readable program code embodied therein for causing decryption of a message, the computer readable program code in said computer program product comprising computer readable program code for causing a computer to effect the functions of claim 11.

24. A non-transitory program storage device readable by machine, tangibly embodying a program of instructions executable by the machine to perform method steps for decrypting a message, said method steps comprising the steps of claim 13.

* * * * *